US008730173B2

(12) United States Patent
Ishikawa et al.

(10) Patent No.: US 8,730,173 B2
(45) Date of Patent: May 20, 2014

(54) ELECTRONIC DEVICE WITH PREDICTIVE CANDIDATE SELECTION BASED ON CHARACTER INPUT

(75) Inventors: Shuuji Ishikawa, Kanagawa (JP); Yasumasa Sekigami, Kanagawa (JP); Takafumi Oka, Kanagawa (JP); Hiroyuki Bamba, Kanagawa (JP); Michiko Takei, Kanagawa (JP); Nayu Noumachi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 91 days.

(21) Appl. No.: 13/120,975

(22) PCT Filed: Sep. 25, 2009

(86) PCT No.: PCT/JP2009/066620
§ 371 (c)(1),
(2), (4) Date: Mar. 25, 2011

(87) PCT Pub. No.: WO2010/035774
PCT Pub. Date: Apr. 1, 2010

(65) Prior Publication Data
US 2011/0181504 A1 Jul. 28, 2011

(30) Foreign Application Priority Data

Sep. 26, 2008 (JP) ................................ 2008-248438
Oct. 28, 2008 (JP) ................................ 2008-276701
Jul. 27, 2009 (JP) ................................ 2009-174694

(51) Int. Cl.
*G09G 5/00* (2006.01)
*G06F 3/023* (2006.01)
*G06F 17/27* (2006.01)

(52) U.S. Cl.
CPC ............ *G06F 3/0237* (2013.01); *G06F 17/276* (2013.01); *Y10S 345/901* (2013.01)
USPC ........... 345/169; 345/156; 345/172; 345/173; 345/174; 345/184; 345/901; 455/566; 455/575.3

(58) Field of Classification Search
CPC ............... G06F 17/276; G06F 3/0237; H04M 1/274558; H04M 1/72583; H04M 1/72519
USPC .......... 345/156, 169, 901, 172–174; 455/566, 455/575.3
See application file for complete search history.

(56) References Cited

U.S. PATENT DOCUMENTS 4,330,845 A * 5/1982 Damerau ...................... 715/201
5,724,457 A * 3/1998 Fukushima ................... 382/311
(Continued)

FOREIGN PATENT DOCUMENTS

JP 06-004208 A 1/1994
JP 2002-117024 A 4/2002
(Continued)

OTHER PUBLICATIONS

Olanzhen Zhang, Office Action issued in corresponding Chinese Patent Application No. 200980132613.8, pp. 1-11 (Oct. 9, 2012).
(Continued)

*Primary Examiner* — Lun-Yi Lao
*Assistant Examiner* — Peter D McCloone
(74) *Attorney, Agent, or Firm* — Hoffman & Baron, LLP

(57) ABSTRACT

Provided is an electronic device which easily selects and executes an application relating to characters inputted by a user. A cellular phone is provided with a display unit which displays a character input screen, an operation unit for inputting characters to be displayed on the character input screen, and a control unit which controls the display unit to display a candidate for conversion or a predicted candidate of the characters inputted using the operation unit. The control unit displays the name of an application or the name of a processing in the application as the candidate for conversion or a predicted candidate, and when either name is selected, executes the processing of the application corresponding to the selected name.

7 Claims, 21 Drawing Sheets

(56) References Cited

U.S. PATENT DOCUMENTS

| | | | |
|---|---|---|---|
| 2003/0060238 A1* | 3/2003 | McCarthy et al. | 455/566 |
| 2004/0018859 A1* | 1/2004 | Vines | 455/566 |
| 2006/0015822 A1* | 1/2006 | Baig et al. | 715/810 |
| 2007/0156679 A1* | 7/2007 | Kretz et al. | 707/6 |
| 2007/0266013 A1 | 11/2007 | Kang et al. | |
| 2008/0162971 A1* | 7/2008 | Venkata et al. | 713/324 |
| 2010/0169830 A1* | 7/2010 | Kraft et al. | 715/810 |

FOREIGN PATENT DOCUMENTS

| | | | |
|---|---|---|---|
| JP | 2006-222622 A | | 8/2006 |
| JP | 2006-345337 A | | 12/2006 |
| JP | 2006345337 A | * | 12/2006 |
| JP | 2007-328804 A | | 12/2007 |
| JP | 2008-003671 A | | 1/2008 |
| JP | 2008520032 A | | 6/2008 |

OTHER PUBLICATIONS

Notice of Reasons for Rejection issued to JP Application No. 2008-276701, mailed Nov. 13, 2012.

Official Action issued regarding Korean Application No. 10-2011-7007848, Mar. 19, 2013, 5 pages. (English translation, 6 pages.).

Notice of Reasons for Rejection issued to JP Application No. 2008-276701, mailed Jul. 23, 2013, 3 pages.

* cited by examiner

| POSITION INFORMATION OF KEY | KEY ASSIGNMENT |
|---|---|
| ⋮ | ⋮ |
| X2, Y1 | 1 |
| X2, Y2 | 2 |
| X2, Y3 | 3 |
| X3, Y1 | 4 |
| X3, Y2 | 5 |
| X3, Y3 | 6 |
| ⋮ | ⋮ |

| POSITION INFORMATION OF KEY | NUMBER OF TIMES CONSECUTIVELY DEPRESSED | KEY ASSIGNMENT |
|---|---|---|
| ⋮ | | ⋮ |
| X2, Y1 | 1 | あ |
| | 2 | い |
| | 3 | う |
| | 4 | え |
| | 5 | お |
| | | ⋮ |

| POSITION INFORMATION OF KEY | KEY ASSIGNMENT |
|---|---|
| ⋮ | ⋮ |
| X2, Y1 | 1ch |
| X2, Y2 | 2ch |
| X2, Y3 | 3ch |
| X3, Y1 | 4ch |
| X3, Y2 | 5ch |
| X3, Y3 | 6ch |
| ⋮ | ⋮ |

FIG. 14

| INPUT CHARACTER | FUNCTION CANDIDATES |
|---|---|
| RINGTONE | INCOMING SETTING |
| | DOWNLOAD RINGTONE |
| | SET VOLUME LEVEL |
| | PSEUDO INCOMING CALL |
| SOUND | SET RINGTONE |
| | SET VOLUME LEVEL |
| | SOUND EFFECT |
| | SET EARPHONES |
| | SET SECURITY BUZZER |
| | RECORD |
| MUSIC | DOWNLOAD INCOMING MUSIC RINGTONE |
| | DOWNLOAD STANDBY MUSIC |
| | DATA FOLDER |
| IMAGE | DATA FOLDER |
| | MEMORY CARD |
| | CAMERA |
| | GRAPHIC MEMORANDUM |
| | SET WALLPAPER |
| CHARACTER | CHARACTER SIZE |
| | BILINGUAL FUNCTION |
| | CHARACTER FONT |
| | MEMO PAD |
| | MAIL |
| ... | ... |

FIG. 15

| INPUT CHARACTER | FUNCTION CANDIDATES |
|---|---|
| ま<br>(HIRAGANA CHARACTER PRONOUNCED AS "MA") | SILENT MODE |
| | STANDBY SCREEN |
| | SET STANDBY MUSIC |
| | ... |
| め<br>(HIRAGANA CHARACTER PRONOUNCED AS "ME") | MAIL |
| | CREATE NEW MAIL |
| | RECEIVE MAIL |
| | SEND MAIL |
| | UNSENT MAIL |
| | ... |
| ... | ... |

FIG. 16A

| INPUT CHARACTER | PREDICTIVE CANDIDATES |
|---|---|
| ま (HIRAGANA CHARACTER PRONOUNCED AS "MA") | また (HIRAGANA CHARACTER STRING PRONOUNCED AS "MA TA") |
| | まだ (HIRAGANA CHARACTER STRING PRONOUNCED AS "MA DA") |
| | 毎日 (KANJI CHARACTER STRING PRONOUNCED AS "MA I NI CHI") |
| | または (HIRAGANA CHARACTER STRING PRONOUNCED AS "MA TA WA") |
| | 全く (KANJI AND HIRAGANA CHARACTER STRING PRONOUNCED AS "MATTA KU") |
| | マイル (KATAKANA CHARACTER STRING PRONOUNCED AS "MA I RU"; MEANING MILE IN ENGLISH) |
| | ⋮ |

FIG. 16B

| INPUT CHARACTER | PREDICTIVE CANDIDATES |
|---|---|
| ま (HIRAGANA CHARACTER PRONOUNCED AS "MA") | また (HIRAGANA CHARACTER STRING PRONOUNCED AS "MA TA") |
| | まだ (HIRAGANA CHARACTER STRING PRONOUNCED AS "MA DA") |
| | 毎日 (KANJI CHARACTER STRING PRONOUNCED AS "MA I NI CHI") |
| | または (HIRAGANA CHARACTER STRING PRONOUNCED AS "MA TA WA") |
| | 全く (KANJI AND HIRAGANA CHARACTER STRING PRONOUNCED AS "MATTA KU") |
| | マナーモード (KATAKANA CHARACTER STRING PRONOUNCED AS "MANNER MODE" MEANING "SILENT MODE" IN ENGLISH) |
| | ⋮ |

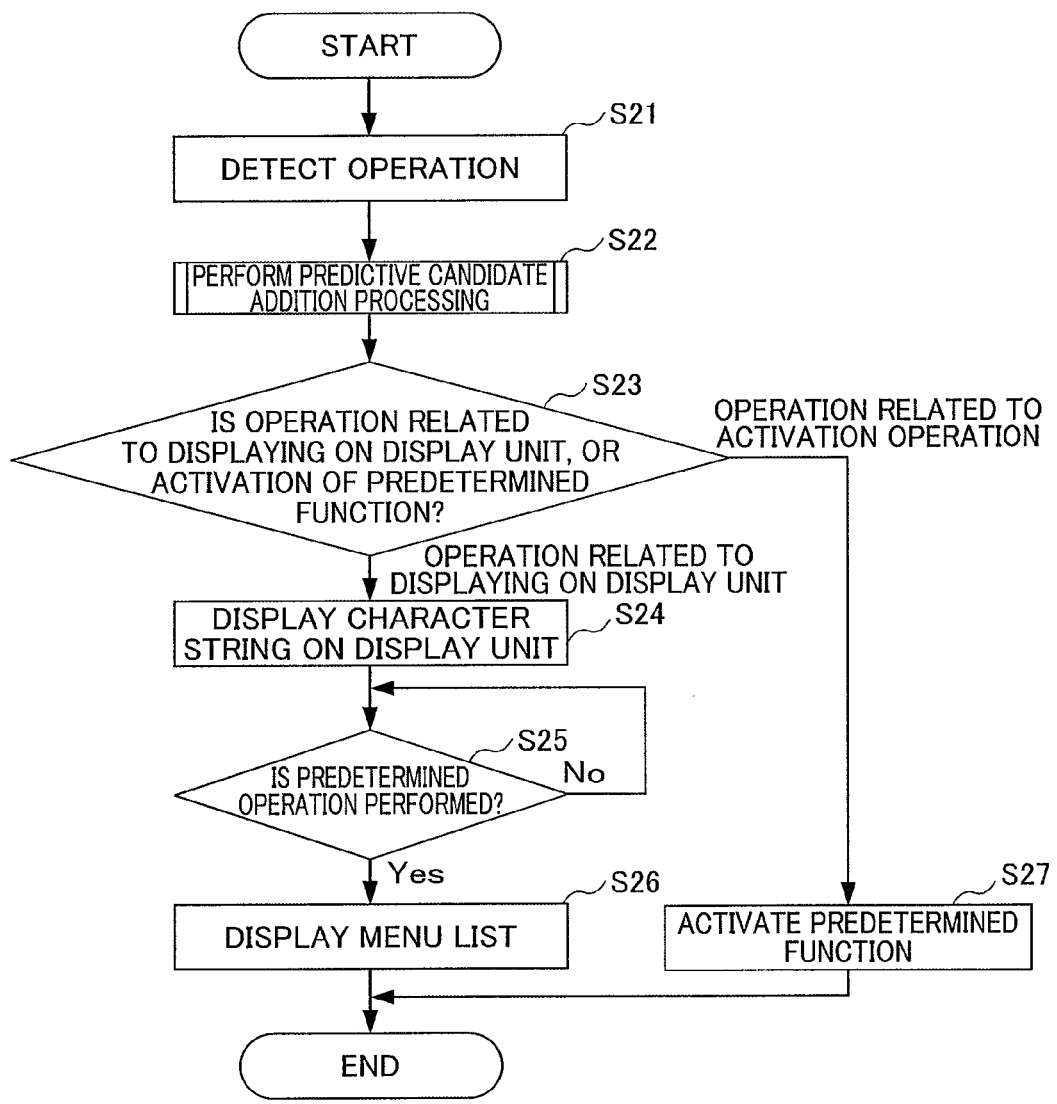

(PREDICTIVE CANDIDATE ADDITION PROCESSING)

ELECTRONIC DEVICE WITH PREDICTIVE CANDIDATE SELECTION BASED ON CHARACTER INPUT

CROSS-REFERENCE TO RELATED APPLICATIONS

This application is the National Stage of International Application No. PCT/JP2009/066620, filed Sep. 25, 2009, which claims the benefit of Japanese Application No. 2008-248438, filed Sep. 26, 2008, Japanese Application No. 2008-276701, filed Oct. 28, 2008, and Japanese Application No. 2009-174694, filed Jul. 27, 2009, the entire contents of all of which are incorporated by reference herein.

TECHNICAL FIELD

The present invention relates to an electronic device that executes processing of an application according to an operational input.

BACKGROUND ART

Conventionally, as a method of inputting a command into an electronic device, a method by selecting a command from a list is employed in many cases. A method has been proposed for such a case, in which commands that are preferentially used are displayed as a predictive list based on a command operation history (for example, see Patent Document 1).

Moreover, in a system capable of inputting a text command, a method has been proposed for predictive keyboard input, in which entries with the highest probability are selected from a database to be displayed as predictive character strings (for example, see Patent Document 2).

Patent Document 1: Japanese Unexamined Patent Application, Publication No. 2002-117024
Patent Document 2: Japanese Unexamined Patent Application, Publication No. 2007-328804

DISCLOSURE OF THE INVENTION

Problems to be Solved by the Invention

However, the method in Patent Document 1 is a technique for storing commands that can be input into a text input application to facilitate command issuing, and thus cannot execute a function corresponding to a character string that has been input by a user. In addition, the method in Patent Document 2 is merely a technique for completing a word by predicting a character string to be input, as input assistance for a user in an application that accepts command input.

Furthermore, in these techniques, a command that has been input or selected is transmitted to a predetermined application to process the command; therefore, it has been difficult to execute an application corresponding to a character string that has been input by a user.

An object of the present invention is to provide an electronic device that can easily select and execute an application related to a character that has been input by a user.

Means for Solving the Problems

An electronic device according to the present invention includes: a display unit that displays a character input screen; an input unit that inputs a character to be displayed on the character input screen; and a control unit that displays, on the display unit, conversion candidates or predictive candidates for the character that has been input from the input unit; in which the control unit displays names of applications or names of processing in the applications as the conversion candidates or the predictive candidates, and when any one of the names is selected, the control unit executes processing of an application corresponding to the name thus selected.

Moreover, when any one of the names is selected, it is preferable for the control unit to execute processing of an application corresponding to the name thus selected, or execute processing of displaying the name thus selected as a character string on the display unit.

An electronic device according to the present invention includes: a display unit that displays a character input screen; an input unit that inputs a character to be displayed on the character input screen; and a control unit that displays, on the display unit, conversion candidates or predictive candidates for the character that has been input from the input unit; in which, when a name of an application is displayed as an input character string on the display unit, the control unit displays names of processing in the application as predictive candidates regarding the name of the application, and when a name of the processing is selected, the control unit executes the processing corresponding to the name.

In addition, when the name of the processing is selected, it is preferable for the control unit to execute processing corresponding to the name, or execute processing of displaying the name of the processing as a character string on the display unit.

Furthermore, the electronic device according to the present invention further includes a sensor that detects motion, and it is preferable for the control unit to accept selection of any one of the names of the processing according to a type of motion detected by the sensor.

Moreover, it is preferable for the control unit to display the names of the processing when the sensor detects predetermined motion in a state where the predictive candidates are displayed, or to display the predictive candidates when the sensor detects predetermined motion in a state where the names of the processing are displayed.

In addition, it is preferable for the control unit to display the names of the processing as ranked high in order when the sensor detects predetermined motion in a state where the names of the processing are displayed as mixed with the predictive candidates, or to display the names of the processing as mixed with the predictive candidates when the sensor detects predetermined motion in a state where the names of the processing are displayed as ranked high in order.

Furthermore, in response to the input unit accepting input of a character in a state where an initial screen is displayed on the display unit, it is preferable for the control unit to activate an application related to the character input screen that displays the character thus input.

An electronic device according to the present invention includes: a display unit that displays a character input screen; an input unit that inputs a character to be displayed on the character input screen; and a control unit that displays, on the display unit, conversion candidates or predictive candidates for the character that has been input from the input unit; in which the control unit displays names of applications in a plurality of different display modes as the conversion candidates or the predictive candidates, and when selecting a name of an application displayed in one display mode from among the plurality of display modes, the control unit executes processing regarding an application corresponding to the name thus selected.

Moreover, when a name of an application displayed in one display mode among the plurality of display modes is selected, it is preferable for the control unit to execute processing regarding an application corresponding to the name thus selected, and when a name of an application displayed in another display mode among the plurality of display modes is selected, it is preferable for the control unit to display the name of the application as a character string on the display unit.

Effects of the Invention

According to the present invention, it is possible to easily select and execute an application related to a character that has been input by a user.

BRIEF DESCRIPTION OF THE DRAWINGS

FIG. 14 is a diagram showing an example of a function execution table according to the fifth embodiment;

FIG. 15 is a diagram showing an example of the function execution table according to the fifth embodiment;

FIG. 16 is a diagram showing an example of a predictive conversion candidate table according to the fifth embodiment;

FIG. 17 is a flowchart showing processing flow of the control unit according to the fifth embodiment;

PREFERRED MODE FOR CARRYING OUT THE INVENTION

First Embodiment

Figure 1:
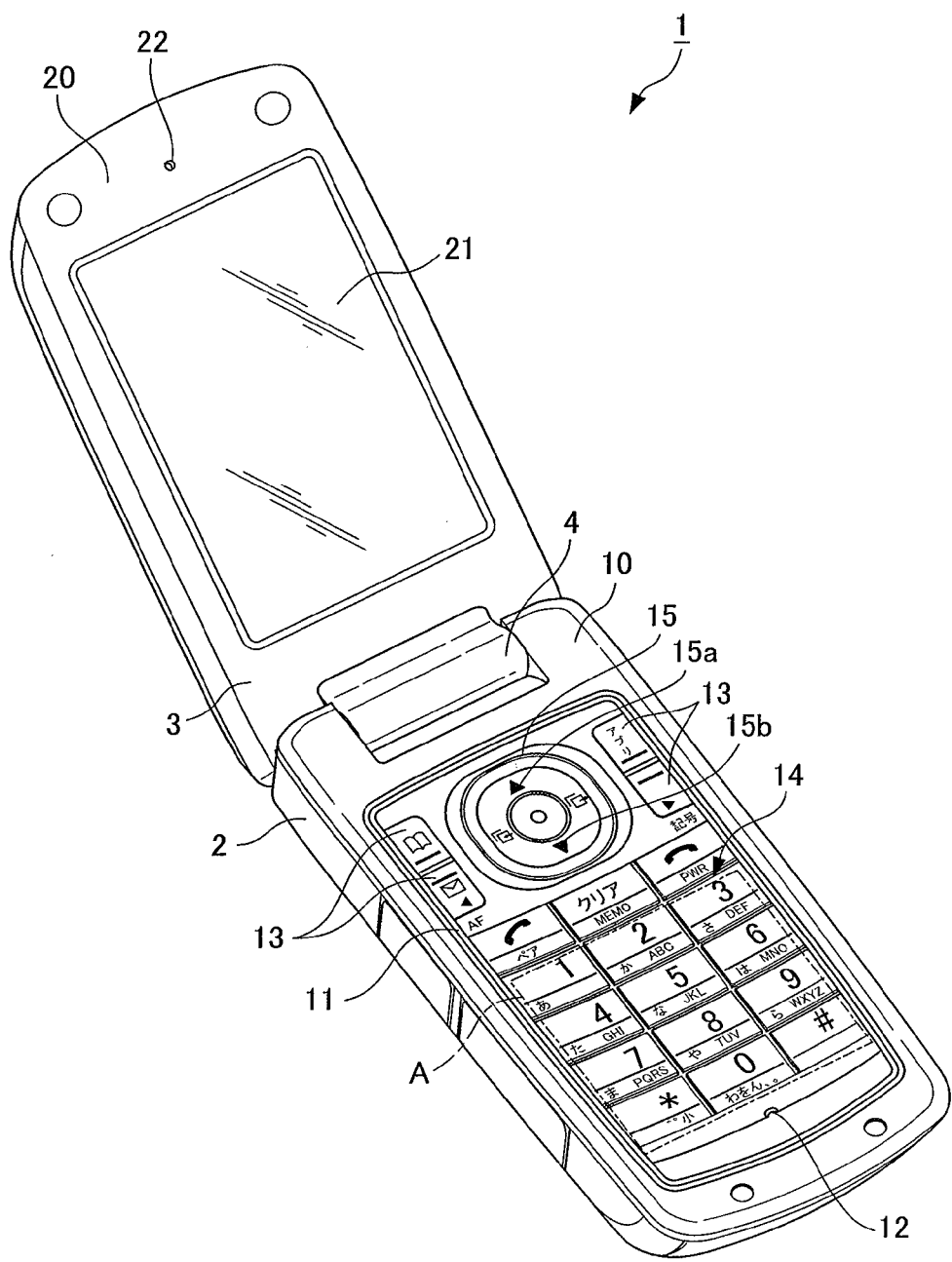
FIG. 1 is a perspective view showing the appearance of a cellular telephone device according to a first embodiment.

A description is provided hereinafter regarding a first embodiment of the present invention. FIG. 1 is a perspective view showing the appearance of a cellular telephone device 1 as an example of an electronic device according to the present invention. It should be noted that, although FIG. 1 shows what is called a folding-type cellular telephone device, the cellular telephone device according to the present invention is not particularly limited thereto. For example, the cellular telephone device may be: a slider type in which one body slides to one direction in a state in which two bodies are mutually superimposed; a rotating (turning) type in which one of the bodies is rotated about an axis line along the direction in which the bodies are superimposed; and a type (straight type) in which an operation unit and a display unit are disposed in one body without having a connecting portion.

The cellular telephone device 1 includes an operation unit side body 2 and a display unit side body 3. The operation unit side body 2 includes, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone number directory function and a mail function; input operation keys 14 for inputting the digits of a telephone number and characters for mail, and the like; and a selection operation key 15 for executing selection of the various operations, scrolling, and the like.

Moreover, the display unit side body 3 includes, on a front face portion 20, a display unit 21 for displaying a variety of information, and a receiver 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (an opened state), and in a state where the operation unit side body 2 and the display unit side body 3 are contacting each other (a folded state), as the operation unit side body 2 and the display unit side body 3, connected via the hinge mechanism 4, pivot with respect to each other.

Figure 2:
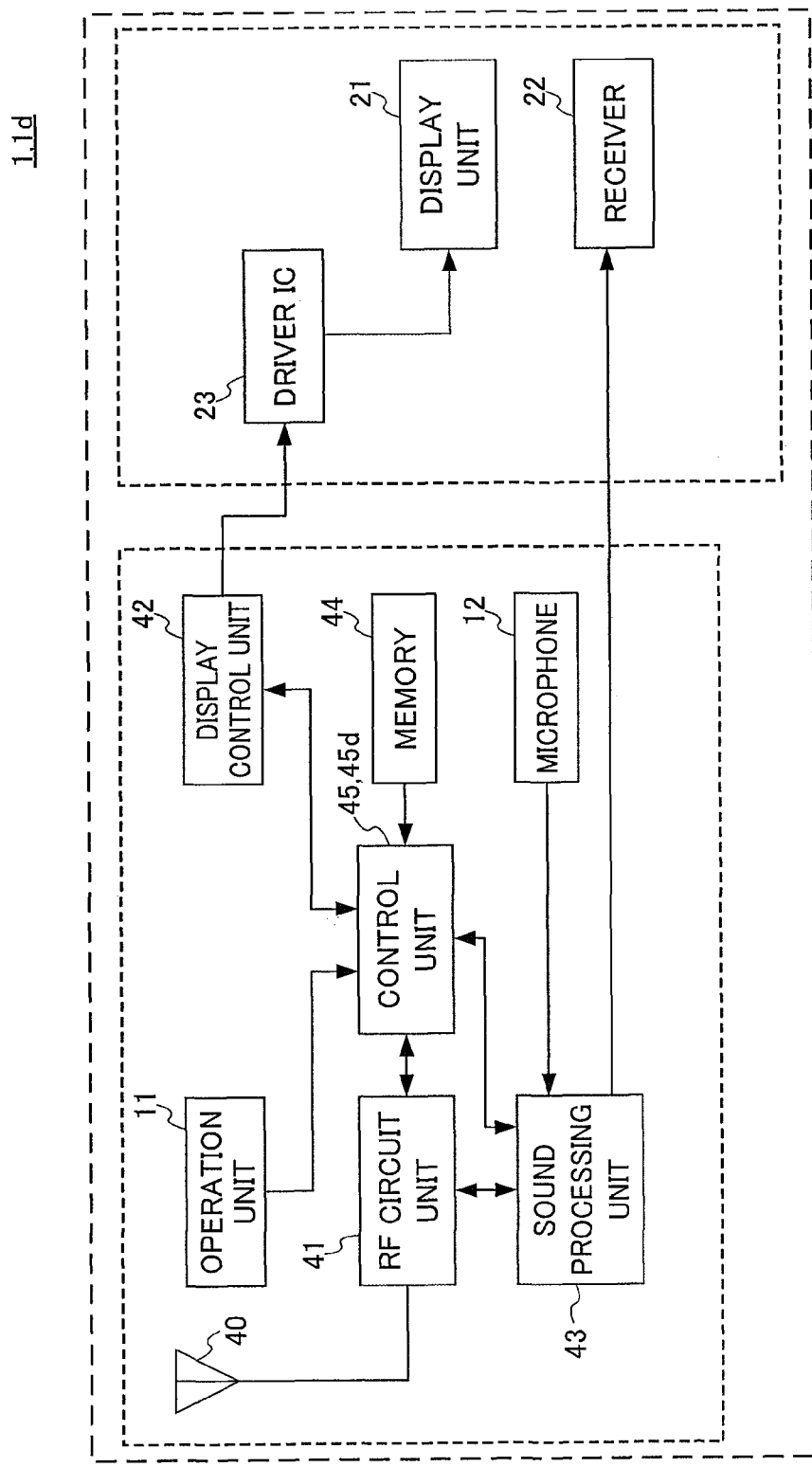
FIG. 2 is a functional block diagram showing functions of the cellular telephone device according to the first embodiment.

FIG. 2 is a functional block diagram showing functions of the cellular telephone device 1. In the cellular telephone device 1, as shown in FIG. 2, the operation unit side body 2 includes the operation unit (input unit) 11, the microphone 12, a main antenna 40, an RF circuit unit 41, a display control unit 42, a sound processing unit 43, memory 44, and a control unit 45. In the cellular telephone device 1, the display unit side body 3 includes the display unit 21, the receiver 22, and a driver IC 23.

The main antenna 40 communicates with a base station or the like via a first usable frequency band (for example, 800 MHz), and is configured as a dual band compatible antenna that is compatible with a second usable frequency band (for example, 1.5 GHz) for GPS communication. It should be noted that, although 800 MHz is set as the first usable frequency band in the present embodiment, other frequency bands can also be used. Moreover, the main antenna 40 may communicate with an external device via the first usable frequency band, and another antenna compatible with the second usable frequency band for GPS communication may be separately provided.

The RF circuit unit 41 executes demodulation processing of a signal received via the main antenna 40, and transmits the processed signal to the control unit 45. The RF circuit unit 41 executes modulation processing of the signal transmitted from the control unit 45, and transmits the signal to external devices (base stations) via the main antenna 40. In addition, on the other hand, the RF circuit unit 41 notifies the control unit 45 of the intensity of a signal received via the main antenna 40.

The display control unit 42 executes predetermined image processing according to control by the control unit 45, and outputs the processed image data to the driver IC 23. When the image data is transmitted from the display control unit 42, the driver IC 23 stores the image data in frame memory, and outputs the image data on the display unit 21 at predetermined timing.

The sound processing unit 43 executes predetermined sound processing according to control by the control unit 45 on a signal transmitted from the RF circuit unit 41, and outputs the processed signal to the receiver 22 or a speaker (not shown). The receiver 22 outputs the signal that is transmitted from the sound processing unit 43, to the outside.

Furthermore, when a signal is input from the microphone 12, the sound processing unit 43 processes the signal according to control by the control unit 45, and outputs the processed signal to the RF circuit unit 41. The RF circuit unit 41 executes predetermined processing on the signal transmitted from the sound processing unit 43, and outputs the processed signal to the main antenna 40.

The memory 44 includes, for example, working memory, and is utilized for arithmetic processing by the control unit 45. Moreover, the memory 44 stores a plurality of applications as well as a variety of tables and the like, required by the applications. In addition, the memory 44 may also serve as detachable external memory.

The control unit 45 controls the entirety of the cellular telephone device 1, and is configured to employ a central processing unit (CPU) and the like. Here, a description is provided for control operations of the control unit 45 depending on key operations via the operation unit 11. The control unit 45 changes the characters and functions to be assigned to each key (the function setting operation keys 13, the input operation keys 14 and the selection key 15) configuring the operation unit 11, essentially in accordance with an application that is currently activated.

More specifically, when any key is depressed, the operation unit 11 transmits position information of the key to the control unit 45 (for example, as shown in FIG. 3(*a*), in a case of depressing a key in the second line and the left row among the input operation keys 14 (a key with "1" and "a" printed on its surface; position information of (X2, Y1) is transmitted). The control unit 45 accesses the memory 44, refers to a key assignment table corresponding to an application that is currently activated, and executes processing of a character and a function assigned thereto, based on the position information that has been transmitted from the operation unit 11. For example, as shown in FIGS. 3(*b*) to 3(*d*), the memory 44 stores a plurality of key assignment tables. It should be noted that FIG. 3(*b*) is a table that is utilized when an outgoing telephone call is made; FIG. 3(*c*) is a table that is utilized in a memo pad application and a mail application; and FIG. 3(*d*) is a table that is utilized when changing a channel in a television tuner application.

It should be noted that execution of processing of a character means that, for example, in a case in which the currently activated application is a memo pad application, "1" or "a" is displayed on the display unit 21. Furthermore, execution of processing of a function means that, for example, in a case in which the currently activated application is a television tuner application, the display channel is set to channel 1.

Moreover, the memory 44 stores a plurality of key assignment tables. Depending on the application, the control unit 45 switches a key assignment table to be referred to, refers to a predetermined key assignment table based on position information of a key that has been transmitted from the operation unit 11, and executes predetermined processing.

In this way, the cellular telephone device 1 with such a configuration has a function, in which, in a case in which a key operation is executed in the standby state for communication, a plurality of characters (for example, a numeric character and non-numeric character) assigned to the key are displayed, for example, on separate screen areas in parallel, respectively, and in a case in which a predetermined key operation is executed, a screen displaying one of the characters is activated.

In addition, the cellular telephone device 1 has a function to display conversion candidates or subsequent predictive candidates for a character that has been input from the operation unit 11. Furthermore, the cellular telephone device 1 has a function to execute an application in a case in which a name of the application or a character string indicating the processing details related to the application is input by selecting such a conversion candidate or a predictive candidate.

Figure 4:
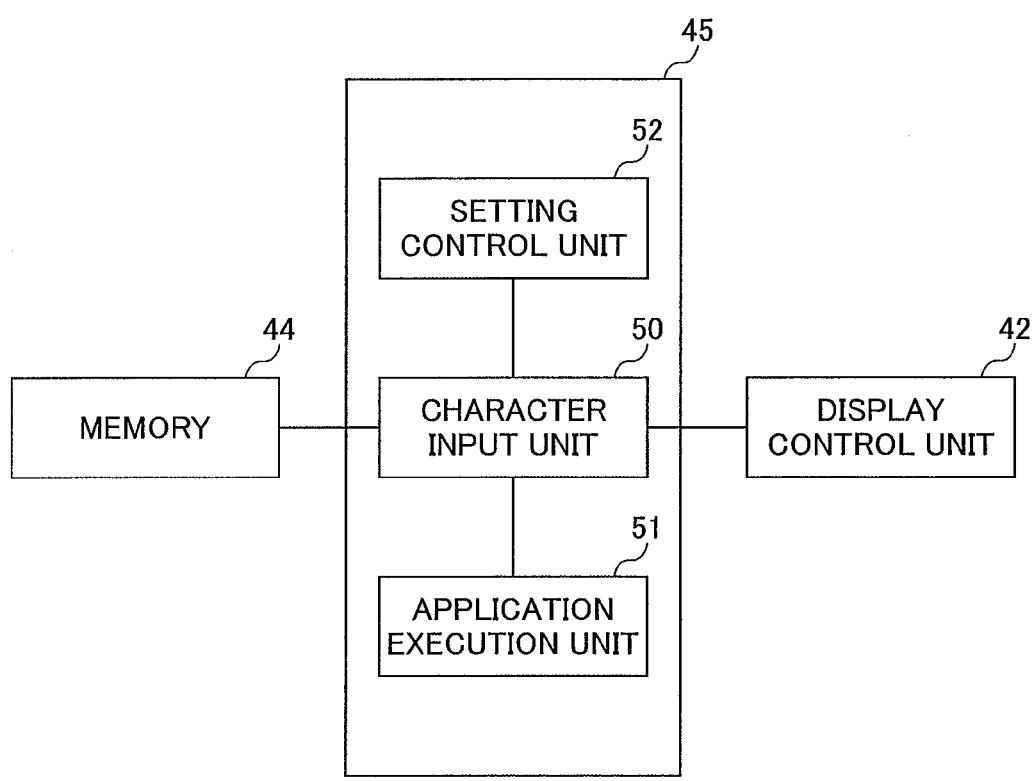
FIG. 4 is a functional block diagram showing functions of a control unit according to the first embodiment.

Here, operations for exhibiting the aforementioned functions are described. As shown in FIG. 4, the control unit 45 of the cellular telephone device 1 includes a character input unit 50, an application execution unit 51, and a setting control unit 52.

In a case in which the user executes a key operation, the character input unit 50 controls the display control unit 42 to display characters assigned to the key. Moreover, the character input unit 50 extracts, from the memory 44, conversion candidates or predictive candidates for the character that has been input, and displays the candidates on the display unit 21 from the display control unit 42.

It should be noted that the memory 44 stores a prediction DB (not shown) in which conversion candidates and predictive candidates are stored and managed. Based on the character that has been input, the character input unit 50 searches the prediction DB to extract kanji character conversion candidates or the like as well as predictive candidates as characters to follow thereafter.

Furthermore, based on the character that has been input, the character input unit 50 extracts, from the memory 44, candidates as applications included in the cellular telephone device 1, or operations (processing) in an application so as to be displayed among conversion candidates or predictive candidates. More specifically, for example, in a case in which a hiragana character "ka" is input, the character input unit 50 displays. Subsequently, in a case in which "camera" is input, or in a case in which "camera" is selected as a predictive candidate, processing names such as "activate" and "how to use" are displayed as predictive candidates as the processing details in the camera application.

It should be noted that activities included in the cellular telephone device 1 (such as names of applications, processing names in the applications, and in addition, names of functions for setting states of the cellular telephone device 1) are stored as data in an activity candidate DB in the memory 44.

In addition, in a case in which the user selects an application name or a processing name, the application execution unit 51 executes the corresponding application (for example, camera, mail, television tuner, etc.) or a specific operation (process) of the application.

Moreover, in addition to executing the applications included in the cellular telephone device 1, the character input unit 50 extracts, from the memory 44, names of functions for setting a state of the cellular telephone device 1 (for example, silent mode, radio-wave-off mode, etc.) so as to be displayed as conversion candidates or predictive candidates. In accordance with such a function name thus selected, the setting control unit 52 executes setting of a state of the cellular telephone device 1.

Figure 5:
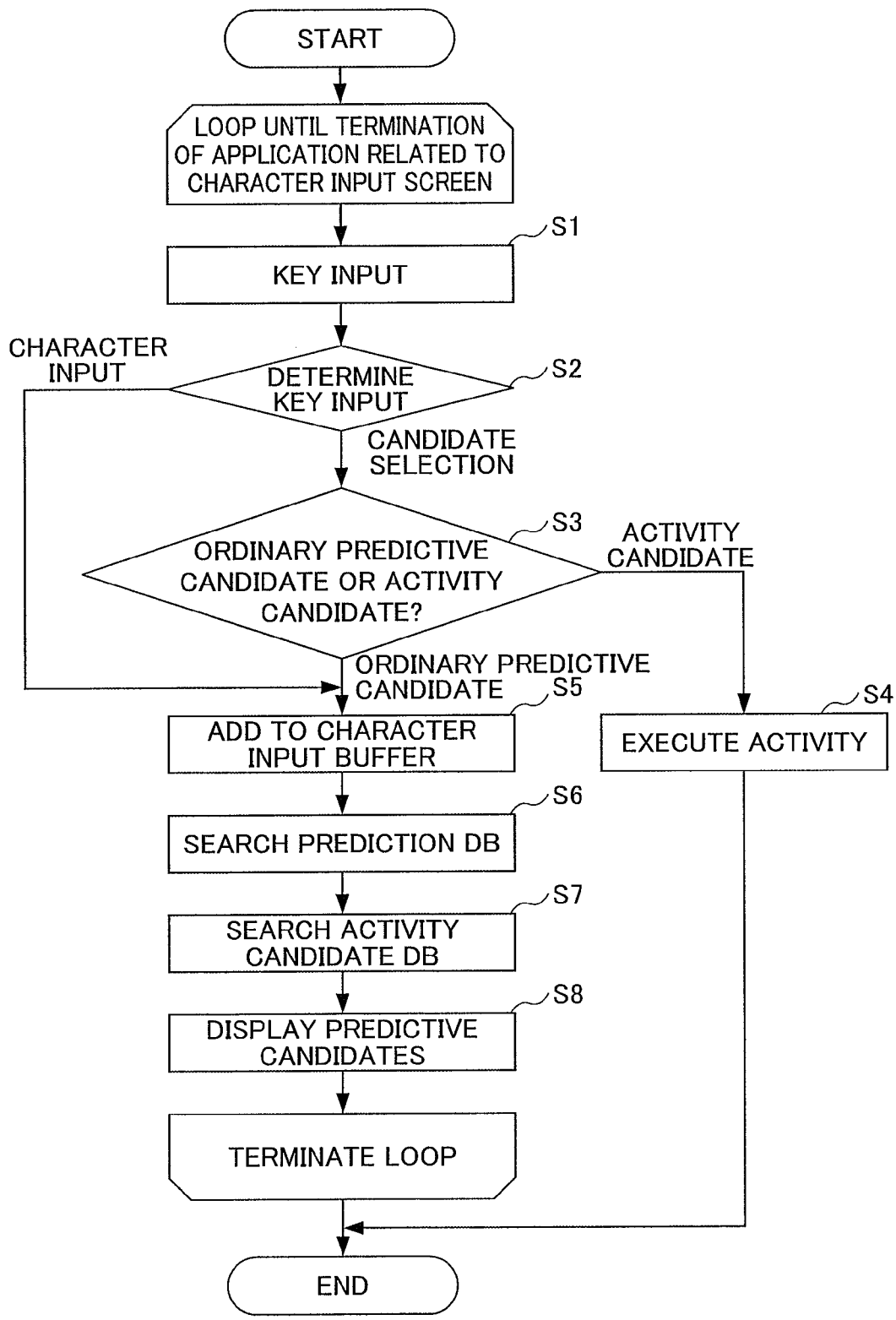
FIG. 5 is a flowchart showing processing of the control unit according to the first embodiment.

FIG. 5 is a flowchart showing processing of the control unit 45 in the cellular telephone device 1 according to the present embodiment. This processing is continuously executed until an application related to a character input screen in the character input unit 50 is terminated.

In Step S1, the control unit 45 accepts a key input from the operation unit 11.

In Step S2, the control unit 45 determines whether the key input accepted in Step S1 is an input of a character or an input related to selection of a conversion candidate or a predictive candidate. In a case in which the input is a character, the processing advances to Step S5, and in a case in which the input is selection of a candidate, the processing advances to Step S3.

In Step S3, the control unit 45 determines whether the candidate selected in Step S2 is an ordinary conversion candidate or predictive candidate, or an activity candidate (for activating an application, or for executing the processing of the application, or for changing the setting of the cellular telephone device 1). In a case in which an ordinary conversion candidate or predictive candidate is selected, the processing advances to Step S5 similarly to the case of a character input, and in a case in which an activity candidate is selected, the processing advances to Step S4.

In Step S4, the control unit 45 executes the activity candidate that is determined as selected in Step S3. As a result, the user can execute an application or function by way of a character(s) that has been input via a character input application.

In Step S5, since the key input accepted in Step S1 is related to a character input, the control unit 45 adds the character corresponding to the key input or the conversion candidate or predictive candidate thus selected to a character input buffer.

In Step S6, the control unit 45 searches the prediction DB stored in the memory 44 to extract conversion candidates and predictive candidates for a character string held in the character input buffer.

In Step S7, the control unit 45 searches the activity candidate DB stored in the memory 44 to extract activity candidates for a character string held in the character input buffer.

In Step S8, the control unit 45 displays the conversion candidates and the predictive candidates extracted in Step S6 and the activity candidates extracted in Step S7, on the character input screen so as to be selectable.

Figure 6:
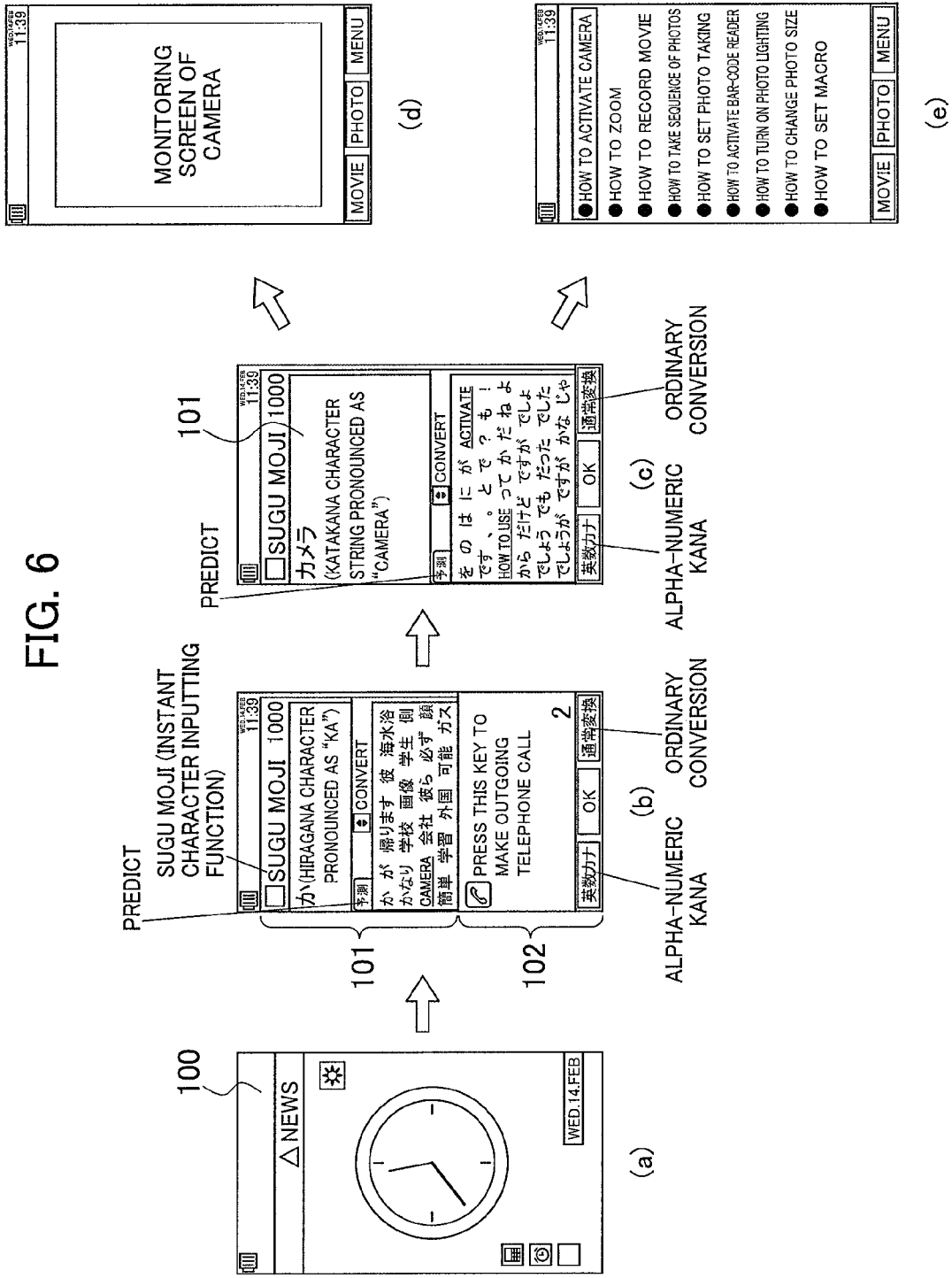
FIG. 6 is a diagram showing an example of screen transitions when executing an application according to the first embodiment.

FIG. 6 is a diagram showing an example of screen transitions when executing an application in the cellular telephone device 1 according to the present embodiment. In this particular example, the control unit 45 executes a camera function based on an input character.

It should be noted that the operation unit 11 is configured to include first keys (for example, keys positioned from the second to fifth lines of the input operation keys 14 indicated by A in FIG. 1) and second keys (for example, an upward operation key 15*a* and a downward operation key 15*b* of the selection operation key 15 shown in FIG. 1).

Moreover, the first keys are configured with a plurality of keys, to which first type characters (for example, hiragana characters such as "a", "i" and "u") and second type characters (for example, numeric characters such as "1", "2" and "3") are assigned. The second keys are keys to which the first type characters and the second type characters are not assigned, and to which a single or plurality of functions (for example, a function of converting hiragana/katakana characters into kanji characters, etc.) are assigned.

First of all, in a state where the display unit 21 is displaying the initial screen 100 that waits for an incoming call (FIG. 6(*a*)), and in a case in which any one of the first keys is depressed, the control unit 45 executes control such that a first type character assigned to the depressed key and a second type character assigned to the depressed key are displayed on the display unit 21 (FIG. 6(*b*)). More specifically, the control unit 45 executes control such that the first type character is displayed on a display area 101, and the second type character is displayed on a display area 102. In addition, the first type character is a character corresponding to, for example, a hiragana character such as "a", "i" and "u", and an alphabetical character such as "A", "B" and "C". The second type character is a character corresponding to, for example, a numeric character such as "1", "2" and "3".

At this time, the control unit 45 displays an application name ("camera"), of which initial character is the input character (first type character), together with conversion candidates or predictive candidates, on the display area 101 so as to be selectable. It should be noted that the application name is displayed by distinguishing its display font, display color, decoration or the like from the others. As a result, the user can easily identify that the selection item is related to executing a function of the cellular telephone device 1.

Subsequently, while the control unit 45 is executing control such that the first type character and the second type character are displayed on the display unit 21, and in a case in which the second key is depressed, the control unit 45 executes conversion processing (such as, for example, processing to convert a hiragana/katakana character into a kanji character, or processing to convert an input character into a character string among the predictive candidates) for the first type character that has been input on the display area 101 (FIG. 6(*c*)). In this particular example, "camera" being an application name is selected and displayed. Furthermore, as a result of accepting the conversion processing, the control unit 45 determines that an input of a numeric character (second type character) is not necessary, and cancels the display area 102.

Here, the control unit 45 displays predictive candidates that should follow the character string "camera", and also displays activity candidates ("activate" and "how to use") that indicate the processing details regarding the camera. It should be noted that the activity candidates are displayed by distinguishing their display font, display color, decoration or the like from the others, similarly to the case of the application name shown in FIG. 6(*b*).

In addition, upon accepting an input for selecting an activity candidate, the control unit 45 executes processing of an application corresponding to such selection. More specifically, in a case in which "activate" is selected, a monitoring screen of the camera is displayed (FIG. 6(*d*)), and in a case in which "how to use" is selected, a help (instruction) screen regarding how to use the camera is displayed (FIG. 6(*e*)).

Figure 7:
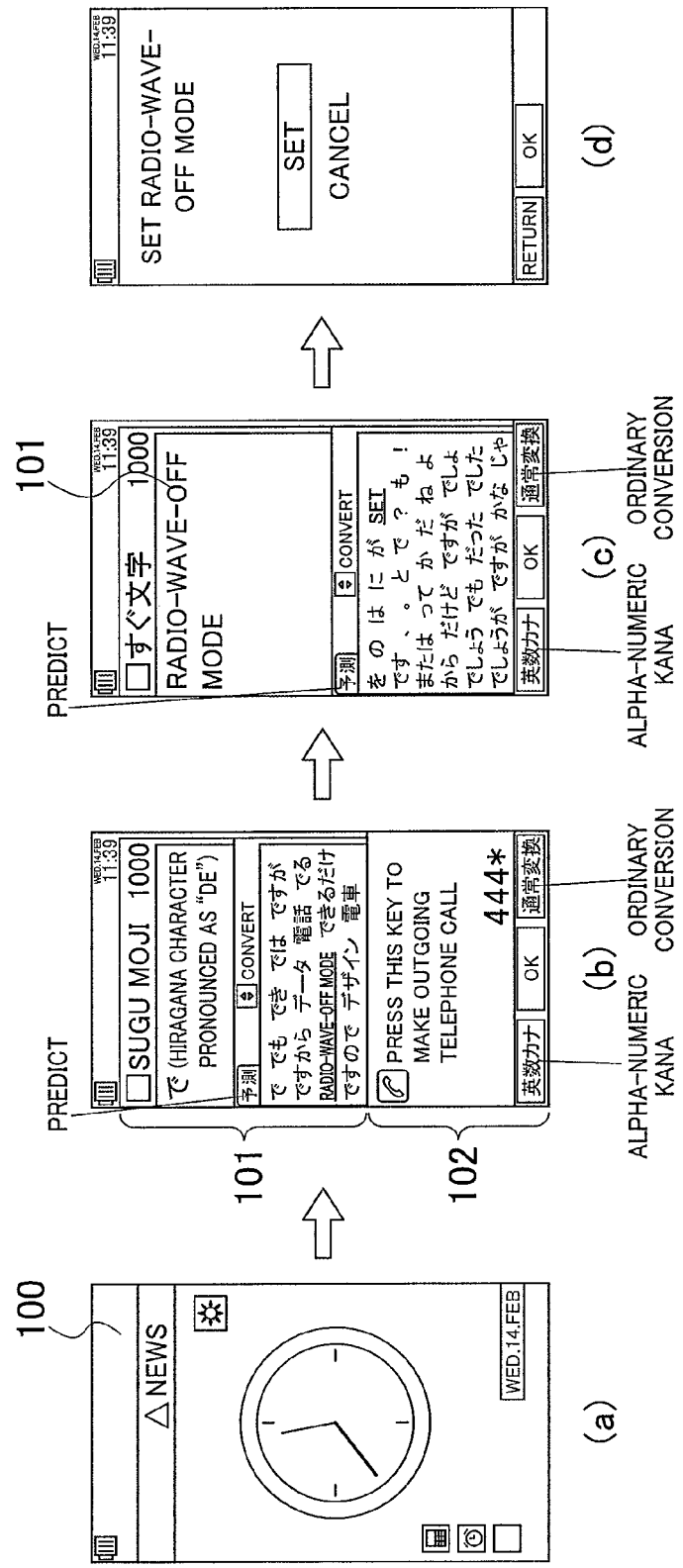
FIG. 7 is a diagram showing an example of screen transitions when setting a function according to the first embodiment.

FIG. 7 is a diagram showing an example of screen transitions when setting a function in the cellular telephone device 1 according to the present embodiment. In this particular example, the control unit 45 sets an operation mode of the cellular telephone device 1 based on an input character.

Similarly to the case of the example shown in FIG. 6, in a state where the display unit 21 is displaying the initial screen 100 (FIG. 7(a)), and in a case in which any one of the first keys is depressed, the control unit 45 executes control such that a first type character is displayed on the display area 101 and a second type character is displayed on the display area 102 (FIG. 7(b)). More specifically, a hiragana character pronounced as "de" is displayed on the display area 101, and a numeric character string "4444*" is displayed on the display area 102.

At this time, the control unit 45 displays on the display area 101 and enables selection of a function name ("radio-wave-off mode"), of which the initial character is the input character (the hiragana character pronounced as "de"), together with conversion candidates or predictive candidates.

Subsequently, while the control unit 45 is executing control such that the first type character and the second type character are displayed on the display unit 21, and in a case in which the second key is depressed, the control unit 45 executes conversion processing (such as, for example, processing to convert a hiragana/katakana character into a kanji character, or processing to convert an input character into a character string among the predictive candidates) for the first type character that has been input on the display area 101 (FIG. 7(c)). In this particular example, "radio-wave-off mode" being a function name is selected and displayed. Furthermore, as a result of accepting the conversion processing, the control unit 45 determines that an input of a numeric character (second type character) is not necessary, and cancels the display area 102.

Here, the control unit 45 displays predictive candidates that should follow the character string "radio-wave-off mode", and also displays an activity candidate ("set").

In addition, upon accepting an input for selecting an activity candidate, the control unit 45 causes the screen to transition to a setting screen corresponding to such selection. More specifically, since "set" is selected for the "radio-wave-off mode", a function setting screen for setting the radio-wave-off mode is displayed (FIG. 7(d)).

According to the present embodiment, the cellular telephone device 1 is capable of activating an application and changing the set state of the cellular telephone device 1, in accordance with an input character string. In particular, since the cellular telephone device 1 is capable of inputting a character by activating a character input application based on a key input on the initial screen (standby screen), an intended operation (such as activating an application or changing the setting) can be easily executed.

Moreover, according to the present embodiment, in the cellular telephone device 1, an application name and a processing name are displayed among conversion candidates or predictive candidates; therefore, an application and processing related to a character string that has been input by the user can be easily selected and executed.

Furthermore, according to the present embodiment, since the cellular telephone device 1 is capable of notifying the user of functions and functional details (processing details) whose existence is not known by the user, the functions included in the cellular telephone device 1 can be anticipated to be effectively utilized.

It should be noted that, in the present embodiment, in the cellular telephone device 1, an application is activated by selecting a processing name after selecting an application name; however, it is not limited thereto. For example, in the cellular telephone device 1, in response to selection of an application name, the application may be activated, and its specific processing details may be executed from a menu in the application.

Moreover, in the present embodiment, in the cellular telephone device 1, processing is executed by selecting an activity candidate (an application name or a processing name) corresponding thereto; however, it is not limited thereto. Instead of selecting from candidates, the cellular telephone device 1 may execute processing by directly inputting an application name or a processing name. At this time, it is preferable to accept selection of whether processing is executed or only characters are displayed.

Moreover, in the present embodiment, in the cellular telephone device 1, a character input, selection of a predictive candidate or the like is executed based on a key input in the operation unit 11; however, it is not limited thereto. For example, a touch panel may be disposed in a position that is superimposed on the display unit 21 to accept selection input; or sound accepted by way of the microphone 12 may be analyzed and associated with a displayed activity candidate.

It should be noted that, in the present embodiment, the control unit 45 displays the application name "camera" on the display area 101; however, the present invention is not limited thereto. For example, the control unit 45 displays the application name "camera" as an underlined character string (see the display area 101 in FIG. 6(b)) and the application name "camera" as a character string without underlining (not shown in the drawing) on the display area 101. In addition, the control unit 45 may execute control such that, in a case in which the application name "camera" as the underlined character string is selected, "camera" as the character string is displayed on the display area 101, and in a case in which the application name "camera" as the character string without underlining is selected, the camera application is activated. In other words, the control unit 45 may execute control such that application names are displayed in different display modes so as to be selectable, and displaying of a character string or processing of an application can be selected depending on the application name selected in a different display mode.

Furthermore, the cellular telephone device 1 may detect motion of the cellular telephone device 1 and accept the type of such motion as a selection input. As configurations for this purpose, second to fourth embodiments including a sensor that detects motion are hereinafter described.

Second Embodiment

A description is provided hereinafter regarding a second embodiment of the present invention. It should be noted that configurations having the same functions as those in the first embodiment are described by assigning the same reference numerals.

Figure 8:
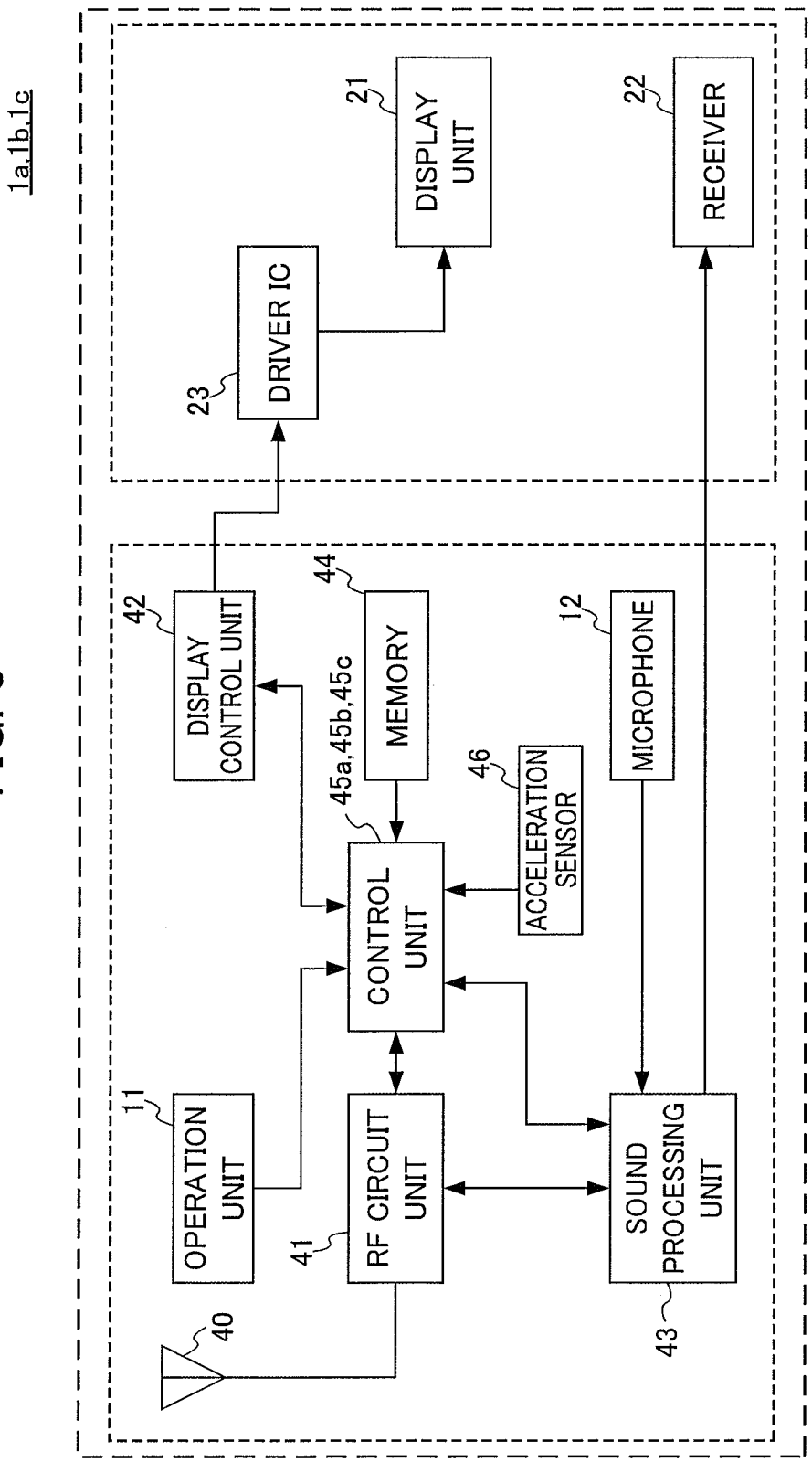
FIG. 8 is a functional block diagram showing functions of a cellular telephone device according to second to fourth embodiments.

FIG. 8 is a functional block diagram showing functions of a cellular telephone device 1a according to the present embodiment. Unlike the cellular telephone device 1 according to the first embodiment, the cellular telephone device 1a further includes an acceleration sensor 46 as a sensor for detecting motion.

The acceleration sensor 46 detects motion of the cellular telephone device 1a as an acceleration value to be provided to a control unit 45a. Based on this acceleration value, the control unit 45a determines the type of motion (such as direction and number of times of motion) of the cellular telephone device 1a. Depending on the type of motion thus determined, the control unit 45a processes the motion as an operational input such as item selection in the character input application.

Figure 9:
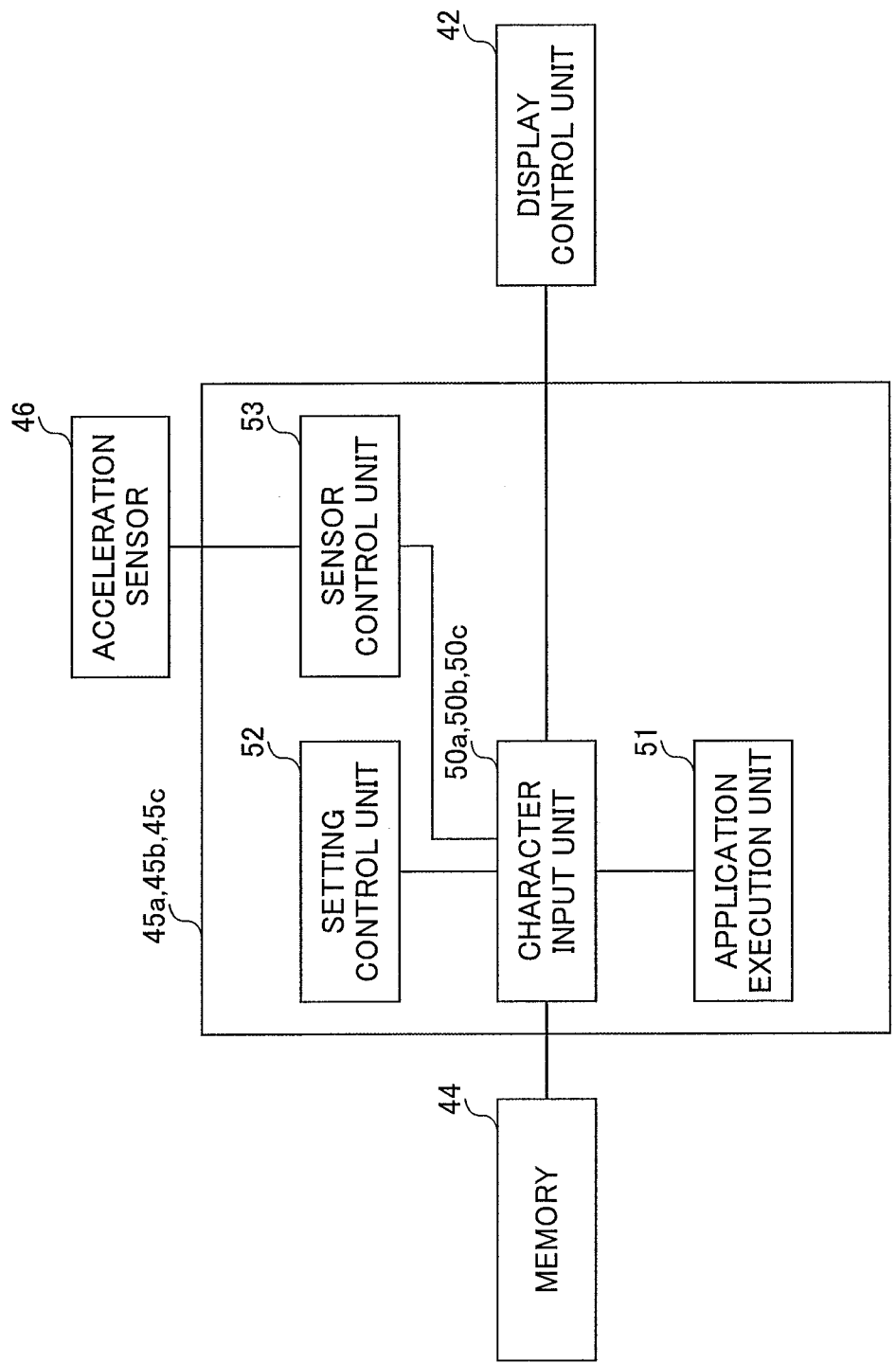
FIG. 9 is a functional block diagram showing functions of a control unit according to the second to fourth embodiments.

FIG. 9 is a functional block diagram showing functions of the control unit 45a. The control unit 45a includes a character input unit 50a, the application execution unit 51, the setting control unit 52, and a sensor control unit 53.

The sensor control unit 53 determines the type of motion by comparing previously stored acceleration patterns and the acceleration value detected by the acceleration sensor 46. A result of such determination is accepted by the character input unit 50a, and serves as an operational input in the character input application. In other words, activity candidates displayed in FIG. 6 (c) are distinguished from one another by way of text colors, decoration and the like, and selected in association with the type of motion thus determined. For example, in a case in which the cellular telephone device 1a is shaken vertically, a candidate in red character(s) is selected, and in a case in which the cellular telephone device 1a is shaken horizontally, a candidate in blue character(s) is selected. Alternatively, a candidate may be selected by an order corresponding to the number of times the cellular telephone device 1a is consecutively shaken.

Figure 10:
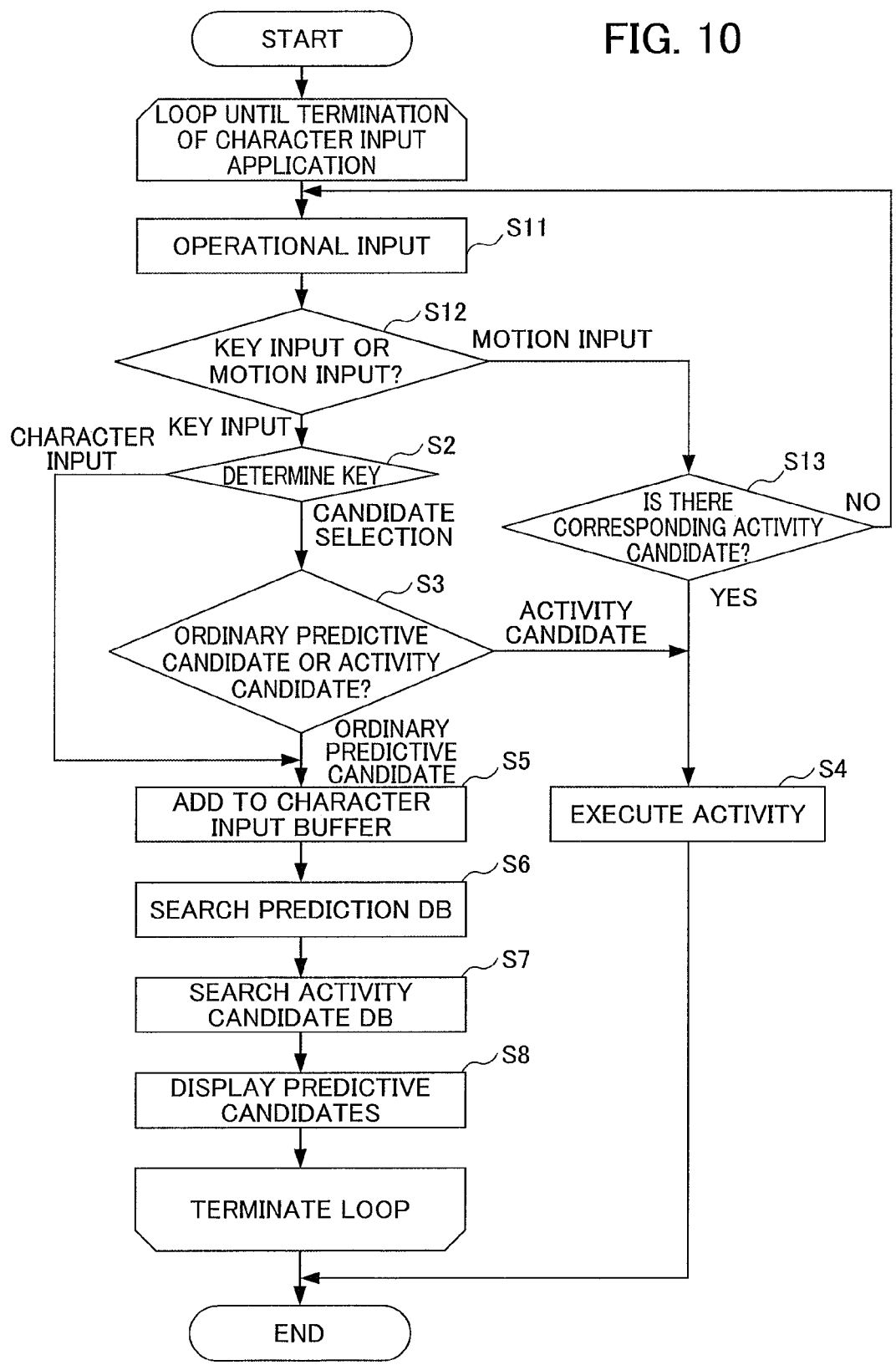
FIG. 10 is a flowchart showing processing of the control unit according to the second embodiment.

FIG. 10 is a flowchart showing processing of the control unit 45a in the cellular telephone device 1a according to the present embodiment. This processing is continuously executed until an application related to a character input screen in the character input unit 50a is terminated.

In Step S11, as an operational input from the user, the control unit 45a accepts a key input from the operation unit 11, or motion input (for example, vertical shaking, horizontal shaking, etc.) from the acceleration sensor 46.

In Step S12, the control unit 45a determines whether the operational input accepted in Step S11 is a key input or motion input. In a case of a key input, the processing advances to Step S2, and in a case of motion input, the processing advances to Step S13.

In Step S13, the control unit 45a determines whether there is (displayed) an activity candidate corresponding to the type of the motion input thus accepted, such as a candidate in blue characters, a second candidate or the like. In a case in which the determination is "YES", the processing advances to Step S4 to execute the activity. On the other hand, in a case in which the determination is "NO", the processing returns to Step S11 to continue acceptance of operational inputs.

More specifically, for example, as shown in FIG. 6(c), in a state where activity candidates ("activate" and "how to use") are displayed among predictive candidates, in a case in which the cellular telephone device 1a is vertically shaken, the control unit 45a determines that "activate" is selected, and displays a monitoring screen of the camera (FIG. 6(d)). On the other hand, in a case in which the cellular telephone device 1a is horizontally shaken, the control unit 45a determines that "how to use" is selected, and displays a help (instruction) screen regarding how to use the camera (FIG. 6(e)).

It should be noted that Steps S2 to S8 are similar to those in the first embodiment, and depending on the contents of a key input, predictive candidates are displayed or an activity is executed.

According to the present embodiment, the cellular telephone device 1a can execute an activity by selection based on motion input; therefore, the user can easily perform execution of various functions.

Third Embodiment

A description is provided hereinafter regarding a third embodiment of the present invention. It should be noted that, although a cellular telephone device 1b of the present embodiment includes a configuration that is similar to the configuration of the cellular telephone device 1a of the second embodiment, a control unit 45b and a character input unit 50b are provided by enhancing the functions of the control unit 45a and particularly the functions of the character input unit 50a, respectively (see FIGS. 8 and 9).

Figure 11:
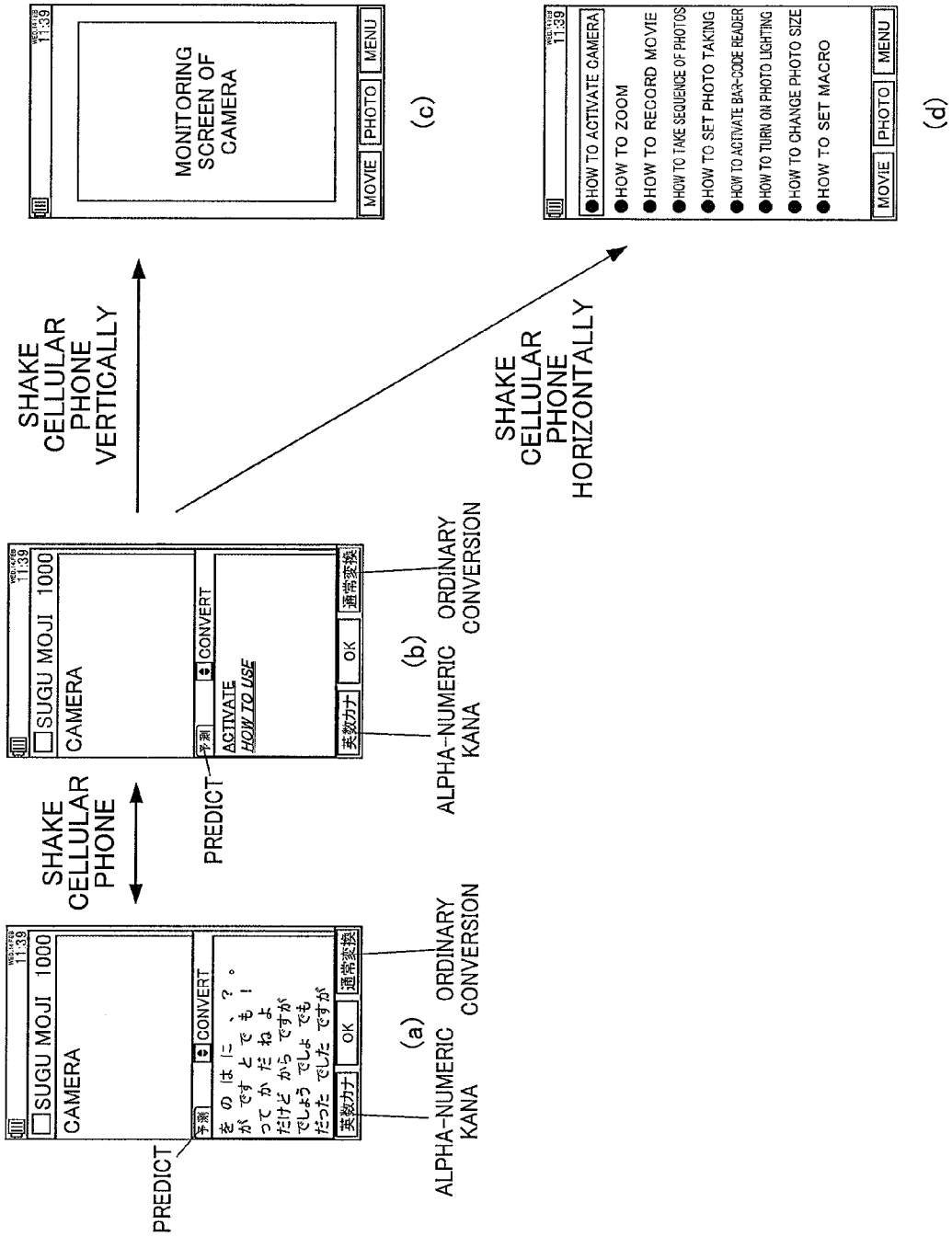
FIG. 11 is a diagram showing an example of screen transitions when executing an application according to the third embodiment.

FIG. 11 is a diagram showing an example of screen transitions for describing processing details of the control unit 45b according to the present embodiment.

First, when a katakana character string pronounced as "camera" is keyed into a character input application, the control unit 45b displays predictive candidates that should follow the character string "camera" (FIG. 11(a)).

Here, in a case in which the control unit 45b determines, based on an acceleration value detected by the acceleration sensor 46, that predetermined motion input has been made, the display is switched to a display of activity candidates regarding "camera" (FIG. 11(b)). Furthermore, in a case in which the control unit 45b determines that a predetermined motion input has been made in a state where activity candidates are displayed, the display is switched to a display of predictive candidates (FIG. 11(a)).

In a case in which the control unit 45b accepts a selection input (for example, motion input or the like such as vertical shaking and horizontal shaking) in a state where activity candidates are displayed, an activity corresponding to this selection input is executed (FIG. 11(c) or 11(d)).

It should be noted that a plurality of activity candidates may be displayed by distinguishing text colors and decoration thereof from others; and instead of this way of distinguishing, a display may be made to indicate a selection method using motion input (for example, "vertical shaking", "shaking once", etc.).

According to the present embodiment, the cellular telephone device 1b can easily switch the displaying of predictive candidates and activity candidates. Therefore, the user can easily view the screen, and the operability can be improved. Such a feature is particularly preferable in a case in which a multitude of predictive candidates make it difficult to display all the activity candidates at the same time.

Fourth Embodiment

A description is provided hereinafter regarding a fourth embodiment of the present invention. It should be noted that, although a cellular telephone device 1c of the present embodiment includes a configuration that is similar to the configuration of the cellular telephone device 1a of the second embodiment, a control unit 45c and a character input unit 50c are provided by enhancing the functions of the control unit 45a and particularly the functions of the character input unit 50a, respectively (see FIGS. 8 and 9).

Figure 12:
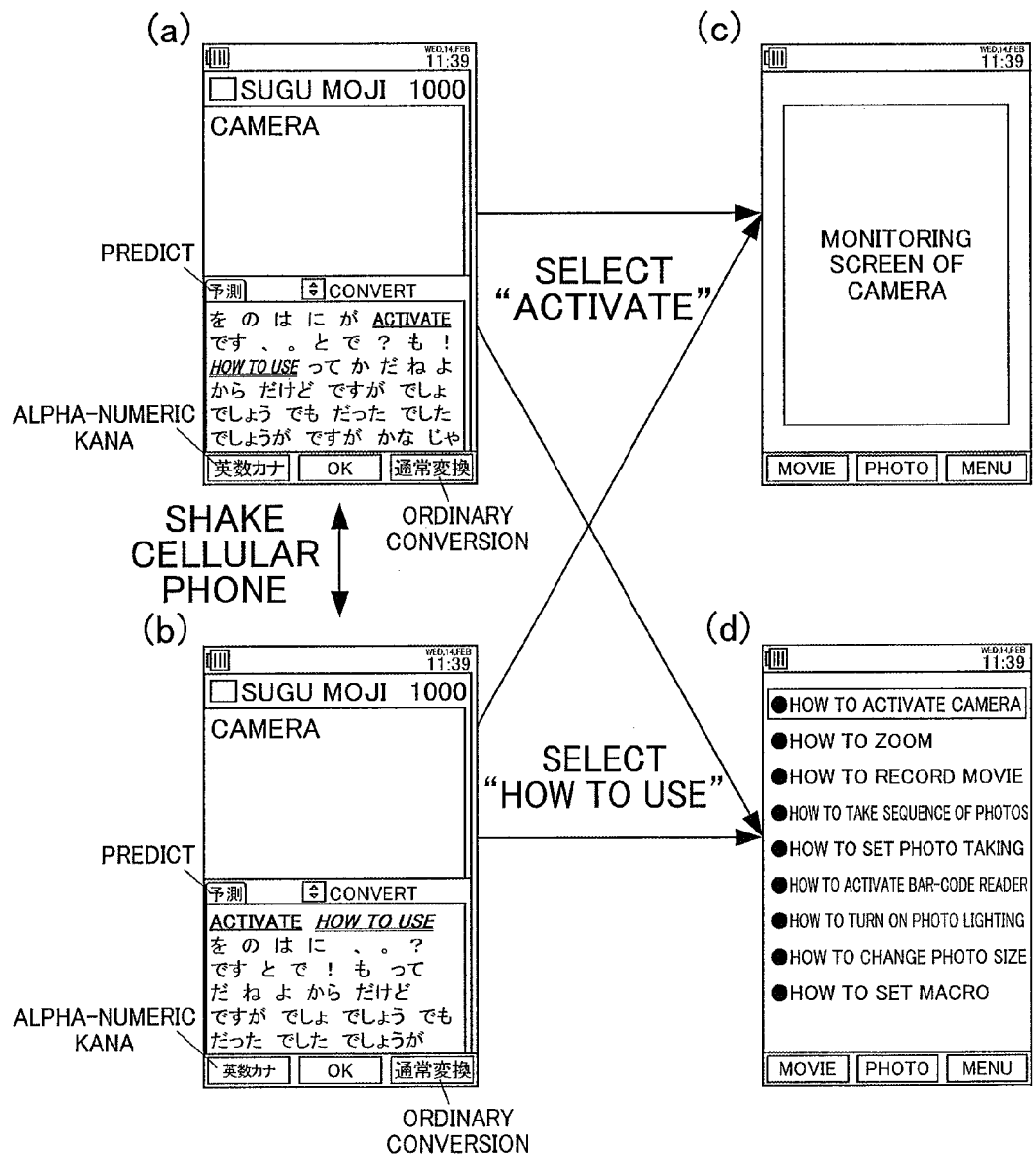
FIG. 12 is a diagram showing an example of screen transitions when executing an application according to the fourth embodiment.

FIG. 12 is a diagram showing an example of screen transitions for describing processing details of the control unit 45c according to the present embodiment.

First, when a katakana character string "camera" is keyed into a character input application, the control unit 45c displays predictive candidates that should follow the character string "camera" as well as activity candidates regarding "camera" (FIG. 12(a)).

Here, in a case in which the control unit 45c determines, based on an acceleration value detected by the acceleration sensor 46, that predetermined motion input has been made, the display is switched to a different display in which activity candidates are ranked high in order (FIG. 12(b)). Furthermore, in a case in which the control unit 45c determines that a predetermined motion input has been made in a state where activity candidates are ranked high in order, the display is switched into the displaying of predictive candidates and activity candidates in a mixed mode (FIG. 12(a)).

In a case in which any one of activity candidates is selected by way of a key input or motion input regardless of the display order of the activity candidate (FIG. 12(a) or 12(b)), the control unit 45c executes an activity corresponding to this selection (FIG. 12(c) or 12(d)).

According to the present embodiment, the cellular telephone device 1c can easily extract activity candidates to be displayed as ranked high in order. Therefore, selection is also facilitated in key input, and thus the operability can be improved. Moreover, in a case in which a multitude of predictive candidates make it difficult to display all the activity candidates at the same time, the cellular telephone device 1c can clearly display activity candidates as ranked high in order, thereby facilitating selection of an activity.

Fifth Embodiment

A description is provided hereinafter regarding a fifth embodiment of the present invention. It should be noted that a cellular telephone device 1d of the present embodiment is different from the cellular telephone device 1 of the first embodiment in that an operation detecting unit 54 and a character string control unit 55 are provided (see FIGS. 2 and 13).

The cellular telephone device 1d with such a configuration has an application that executes a function in which, in a case in which a key operation is executed in the standby state for communication, a plurality of characters (for example, a numeric character and non-numeric character) assigned to the key are displayed, for example, on separate screen areas in parallel, respectively, and in a case in which a predetermined key operation is executed, a screen displaying one of the characters is activated. An application executing this function is hereinafter referred to as application A.

In addition, the application A has a function to display conversion candidates for a character that has been input via the operation unit 11, or predictive candidates to follow thereafter. Furthermore, the application A has a function to execute an application in a case in which a name of the application or a character string indicating the processing details related to the application is input by selecting such a conversion candidate or a predictive candidate.

Figure 13:
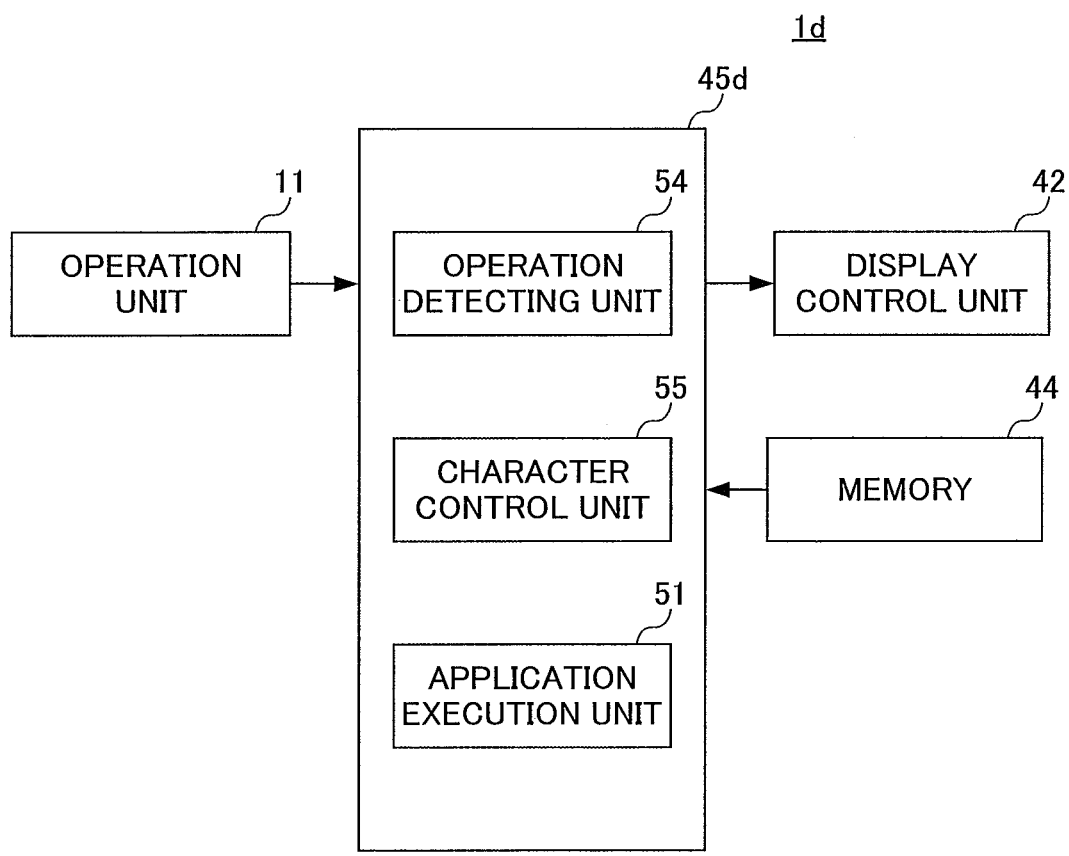
FIG. 13 is a functional block diagram showing functions of a control unit according to a fifth embodiment.

Next, operations of the control unit 45d of the present embodiment are described. FIG. 13 is a functional block diagram showing functions of the control unit 45d. As shown in FIG. 13, the control unit 45d includes the operation detecting unit 54, the character string control unit 55 and an application execution unit 51.

The operation detecting unit 54 detects an operation in the operation unit 11, and notifies the character string control unit 55 of the operation thus detected.

For example, in a case in which the operation detecting unit 54 detects an operation in a state of the standby screen as an initial screen, depending on the operation, the character string control unit 55 displays, on the display unit 21, a predetermined character, a character string associated with a predetermined character in a character string related to (corresponding to) a predetermined function stored in a function execution table of the memory 44 to be described later, information related to a first operation for the character string related to the predetermined function, and information related to a second operation for the character string related to the predetermined function.

In a case in which the first operation for the character string related to the predetermined function is executed, the character string control unit 55 displays the character string related to the predetermined function on the display unit 21, in place of a predetermined character according to an operation displayed on the display unit 21.

In a case in which the second operation for the character string related to the predetermined function displayed on the display unit 21 is executed, the application execution unit 51 activates the function associated with the character string related to the predetermined function.

On the other hand, in a case in which the operation detecting unit 54 detects an operation, for example, in a state different from the initial screen, such as a state where another application (a memo pad, mail (email), or the like) is activated, the character string control unit 55 displays a predetermined character on the display unit 21 depending on this operation, and does not display a character string related to a predetermined character on the display unit 21, among character strings related to a predetermined function stored in the memory 44.

Moreover, a function execution table and a predictive candidate table are stored in the memory 44. In the function execution table, a predetermined function is associated with a character string related to the predetermined function. In the predictive candidate table, a character string related to a predetermined function is associated with a predictive candidate related to the character string. FIGS. 14 and 15 are tables showing an example of the function execution table.

The function execution table shown in FIG. 14 stores input characters (for example, ringtone, etc.) as character strings related to predetermined functions, in association with candidate functions (for example, incoming call setting, ringtone downloading, volume level setting, pseudo incoming call, etc.) as the predetermined functions.

Moreover, the function execution table shown in FIG. 15 stores input characters (for example, hiragana characters such as those pronounced as "ma" and "me" in the Hepburn system) as character strings related to predetermined functions, in association with candidate functions as the predetermined functions.

Function names (for example, incoming call setting) related to input characters as a single word (for example, ringtone) are stored as candidate functions in the function execution table shown in FIG. 14. On the other hand, a function name (for example, silent mode, etc.) including an input character as an initial character of the function name (such as, for example, a hiragana character "ma" as its initial character) is stored as a candidate function in the function execution table shown in FIG. 15.

FIG. 16 is a table showing an example of the predictive candidate table, and showing predictive candidates related to the hiragana input character pronounced as "ma". In the predictive candidate tables shown in FIGS. 16(a) and 16(b), predictive candidates related to the hiragana input character pronounced as "ma" are sorted in a descending order of frequency of use. In a case in which the predictive candidate table is in a state shown in FIG. 16(a), predictive candidates simply including the hiragana input character "ma" are stored, and a character string related to a predetermined function is not included; whereas in a state as shown in FIG. 16(b), the "silent mode" ("manner mode" in Japanese) is included as a predictive candidate, the "silent mode" ("manner mode") being a character string including the hiragana input character "ma", and being a character string related to predetermined functions related to the hiragana input character "ma". Depending on the frequency of using predictive candidates by the user, the predictive candidate table may be changed from the state of FIG. 16(a) to the state of FIG. 16(b), and may be conversely updated from the state of FIG. 16(b) to the state of FIG. 16(a).

It should be noted that, although the predictive candidate table storing predictive candidates is described in the present embodiment, the present invention is not limited thereto, and for example, a conversion candidate table storing conversion candidates may be used in place of the predictive candidate table.

FIG. 17 is a flowchart showing processing flow of the control unit 45d of the present embodiment. In Step S21, the operation detecting unit 54 detects an operation in the operation unit 11, and notifies the character string control unit 55 of the operation thus detected.

In Step S22, the character string control unit 55 executes predictive candidate addition processing. The predictive candidate addition processing is described later.

In Step S23, in a state where a character string related to a predetermined function displayed on the display unit 21 by way of the predictive candidate addition processing is selected (for example, a cursor is located thereon), the character string control unit 55 determines whether an operation related to the displaying of the character string on the display unit 21 in place of a predetermined character is executed, or an operation related to a predetermined function execution is executed. In a case in which the operation related to the displaying on the display unit 21 is executed, the processing advances to Step S24, and in a case in which the operation related to a predetermined function is executed, the processing advances to Step S27.

In Step S24, the character string control unit 55 controls the display control unit 42 to display a character string related to the predetermined function on the display unit 21.

In Step S25, the character string control unit 55 determines whether a predetermined operation is executed. In a case in which a predetermined operation is executed (YES), the processing advances to Step S26, and in a case in which the predetermined operation is not executed (NO), the processing of Step S25 is repeated.

In Step S26, the character string control unit 55 controls the display control unit 42 to display a list of candidates for an application using input characters or a list of operations (processing) in the application on the display unit 21.

In Step S27, the application execution unit 51 activates a function that is associated with a character string related to a predetermined function selected in Step S23.

Figure 18:
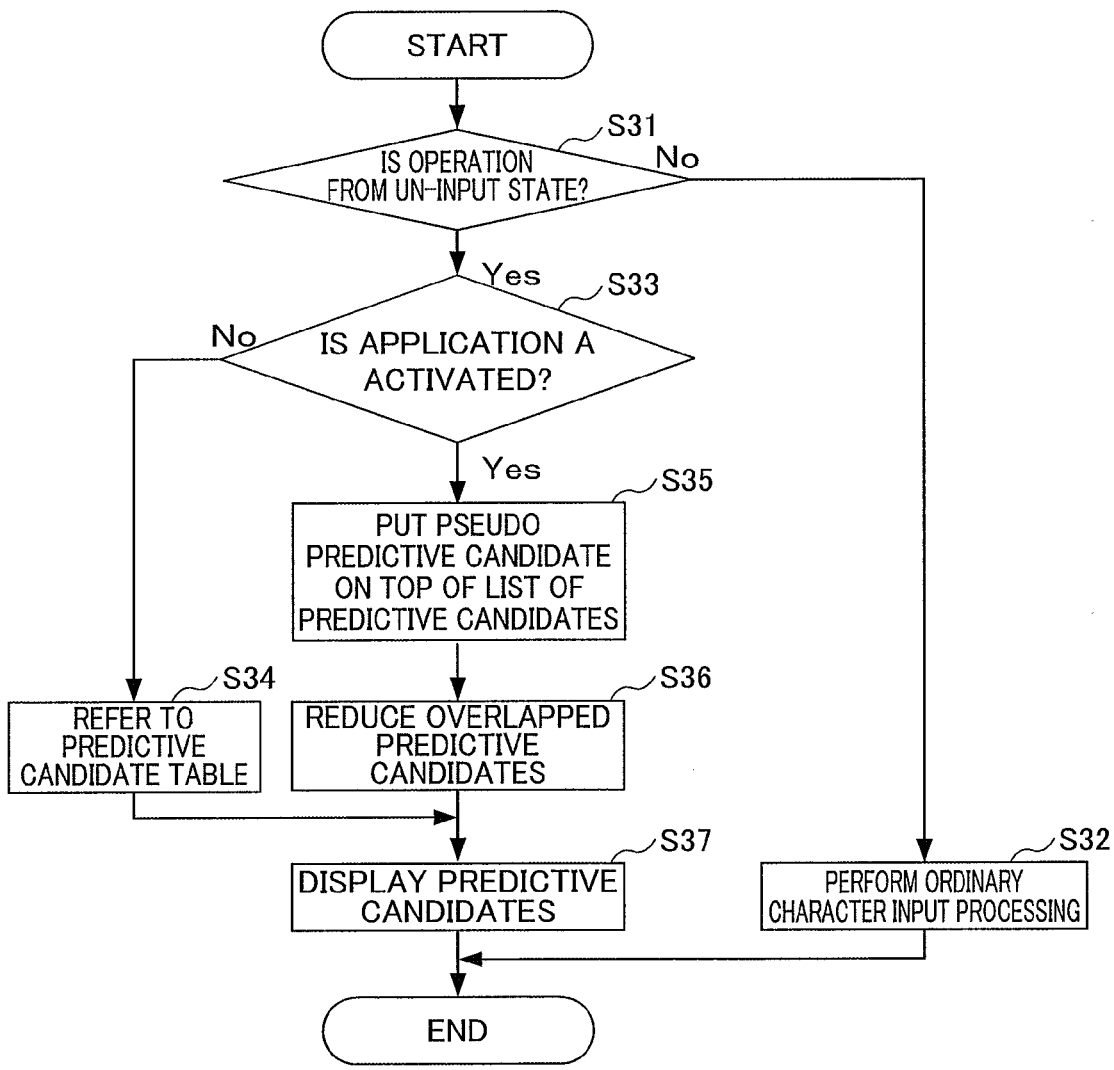
FIG. 18 is a flowchart showing flow of predictive conversion candidate addition processing according to the fifth embodiment.

FIG. 18 is a flowchart specifically showing a flow of the predictive candidate addition processing executed in the processing in Step S22. In Step S31, the character string control unit 55 determines whether the operation detection by the operation detecting unit 54 in Step S21 has been executed from an un-input state where no character is input on a character input screen that allows characters to be input. In a case in which the operation detection has been made from an un-input state (YES), the processing advances to Step S33, and in a case in which the operation detection has been made from a state that is not an un-input state, i.e. from a state where a character has already been input (NO), the processing advances to Step S32.

In Step S32, the character string control unit 55 executes ordinary character input processing. The ordinary character input processing refers to, for example, character input processing according to an operation in the operation unit 11 in a memo pad application.

In Step S33, the character string control unit 55 determines whether the character input screen is displayed due to activation of the application A. In a case in which it is determined that the application A is activated (YES), the processing advances to Step S35, and in a case in which it is determined that the application A is not activated (NO), the processing advances to Step S34.

In Step S34, the character string control unit 55 refers to the predictive candidate table to acquire predictive candidates. At this time, the character string control unit 55 refers to the predictive candidate table shown in FIG. 16(a) or 16(b).

In Step S35, the character string control unit 55 executes control to refer to the predictive candidate table shown in FIG. 16(a) or 16(b) and the function execution table shown in FIG. 14 or 15, to read a predictive candidate and a function name associated with the input character for which an operation has been detected, and to put the function name as a pseudo predictive candidate on top of the list of predictive candidates.

In Step S36, in a case in which any of the predictive candidates acquired from the predictive candidate table overlaps with any of the function names (pseudo predictive candidates) acquired from the function execution table, the character string control unit 55 executes control so as not to display such overlapped predictive candidates on the display unit 21.

In Step S37, the character string control unit 55 controls the display control unit 42 to display the predictive candidates acquired in Step S34 or S36 on the display unit 21.

Figure 19:
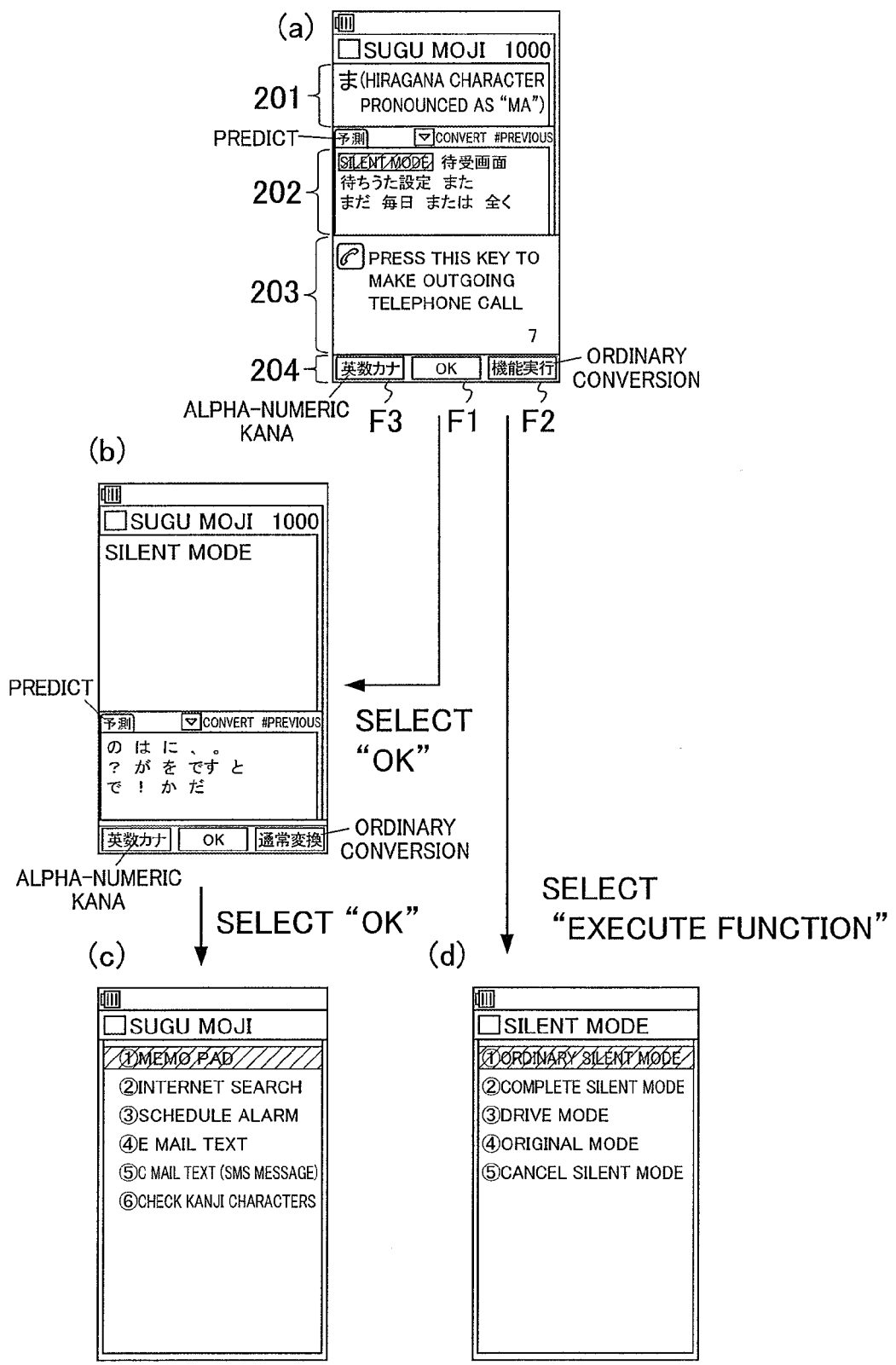
FIG. 19 is a diagram showing an example of screen transitions when operating the control unit according to the fifth embodiment.

Next, a specific example of operations of the control unit 45d is described with reference to FIG. 19. FIG. 19 is a diagram showing an example of screen transitions when the control unit 45d of the present embodiment operates.

Figures 3A, 3B, 3C, 3D:
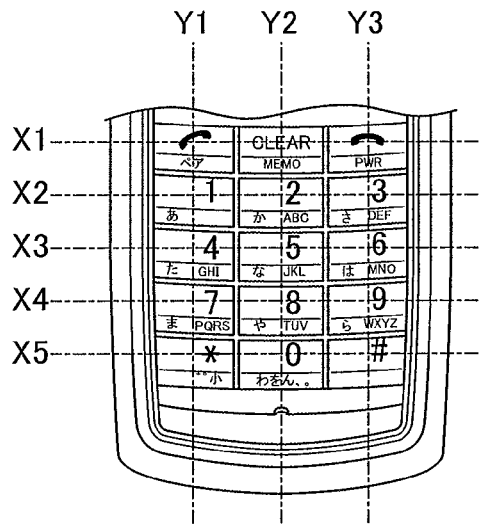
FIG. 3 is a diagram illustrating key assignment according to the first embodiment.

The operation detecting unit 54 detects depression of any key of the operation unit 11 in a state of the standby screen, and transmits position information of the key thus detected (for example, (X4, Y1) in FIG. 3(a)) to the character string control unit 55.

As shown in FIG. 19(a), a display area 201, a display area 202, a display area 203 and a display area 204 are provided to the display unit 21. When the operation is detected by the operation detecting unit 54, and the position information of the detected key is received, the character string control unit 55 displays a hiragana character "ma" as a predetermined character on the display area 201. On the display area 202, the character string control unit 55 displays Japanese character strings such as "ma to", "ma da" and "ma i ni chi" as predictive candidates related to the predetermined character, and Japanese character strings such as "manner mode (silent mode)", "ma chi u ke gamen (standby screen)" and "ma chi u to settei (standby music setting)" as character strings related to the predetermined character, among character strings related to predetermined functions. A numeric character "7" is displayed on the display area 203. This numeric character "7" is used by an application executing a telephone call function. As shown in FIG. 19(a), in a case in which the cursor is located on a character string related to a predetermined function, a "softkey F1" as information related to a first operation for the character string related to the predetermined function, and a "softkey F2" and a "softkey F3" as information related to a second operation for the character string related to the predetermined function are displayed on the display area 204. Moreover, a character string "OK" is displayed on the softkey F1, a character string "function execution" is displayed on the softkey F2, and a character string "alphanumeric/katakana" is displayed on the softkey F3. It should be noted that, in a case in which the cursor is located on a hiragana character string such as "ma ta" and "ma da" that are predictive candidates related to the predetermined character, a character string "ordinary conversion" is displayed on the softkey F2 similarly to the case of FIG. 19(*b*). The character string "OK" is displayed on the softkey F1 similarly to the aforementioned case.

In addition, in a case in which the operation detecting unit 54 detects an operation on the softkey F1, the character string control unit 55 displays a character string "manner mode (silent mode)" in place of the hiragana character "ma" on the display area 201 (FIG. 19(*b*)). Subsequently, depending on the necessity, in a case in which a predetermined operation (for example, selection of "OK" by way of a depression operation of the selection operation key 15 in FIG. 1) is executed in the operation unit 11, the display unit 21 displays a menu item list for displaying a list of candidates of applications using the "silent mode" as an input character string or a list of operations (processing) in an application (FIG. 19(*c*)).

On the other hand, in a case in which the operation detecting unit 54 detects an operation on the softkey F2, the application execution unit 51 activates the "silent mode" function, and a list of subsequent processing is displayed (FIG. 19(*d*)).

Figure 20:
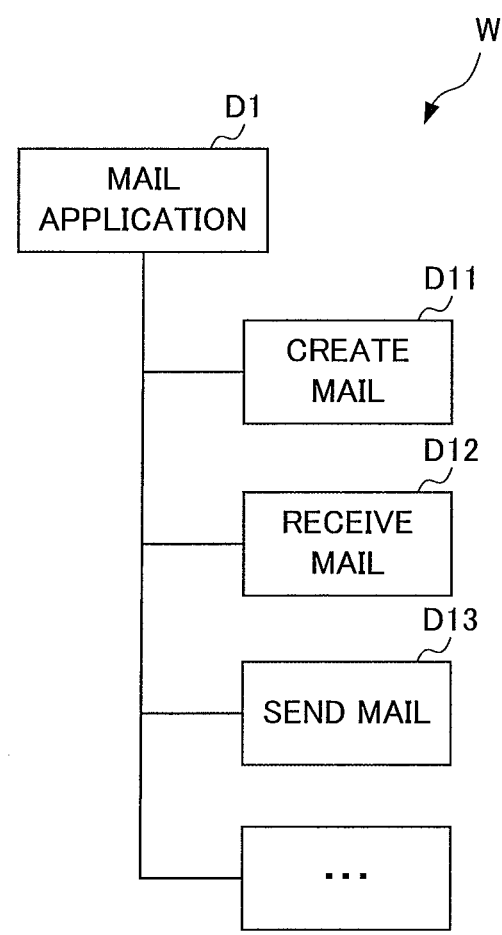
FIG. 20 is a diagram showing a hierarchical structure of a mail (email) application according to the fifth embodiment.
Figure 21:
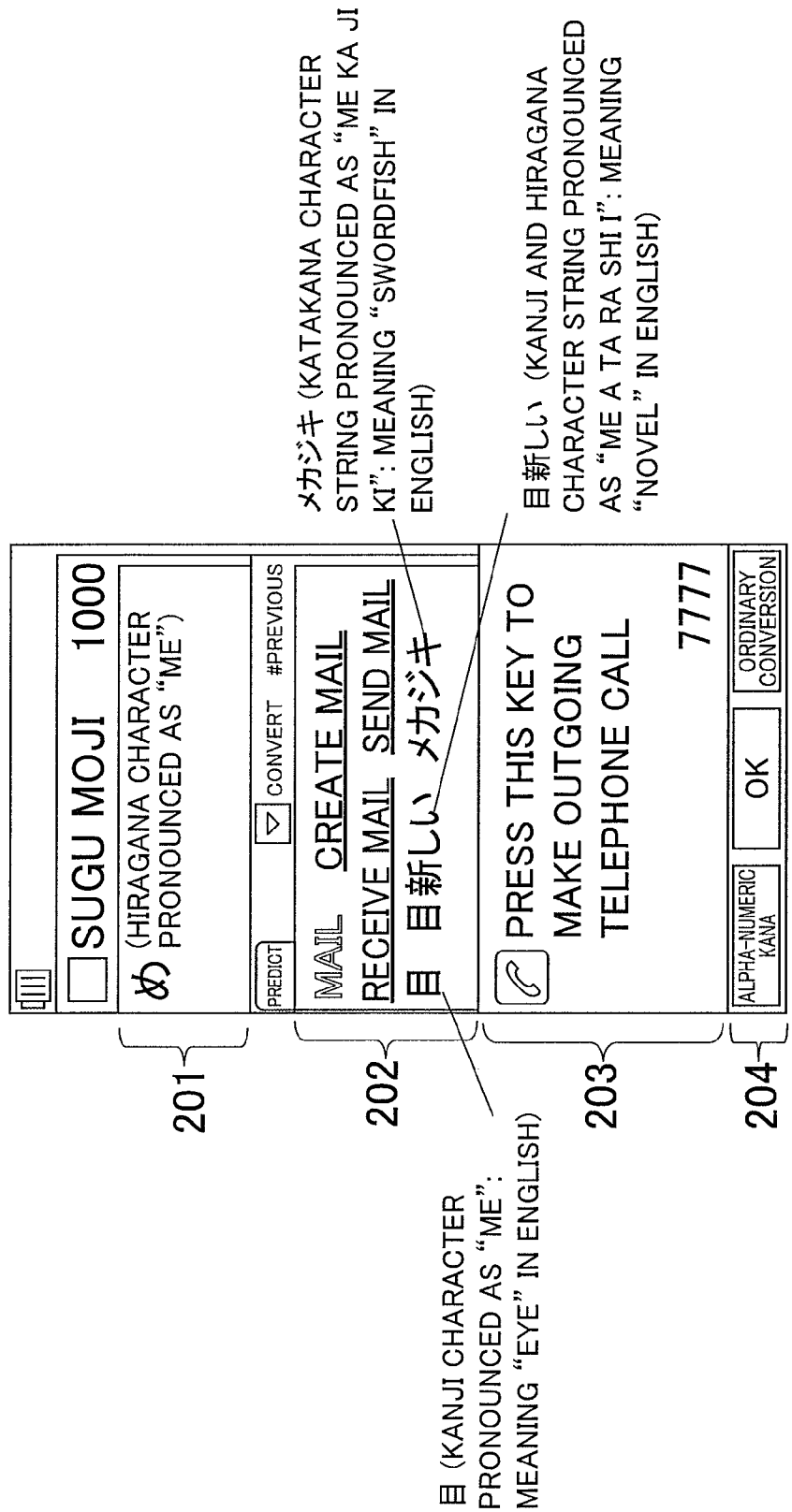
FIG. 21 is a diagram showing a specific example of predictive candidates displayed on a display unit according to the fifth embodiment.

Next, a display mode of predictive candidates displayed on the display unit 21 is described with reference to FIGS. 20 and 21. FIG. 20 is a diagram showing a hierarchical structure of a mail application. FIG. 21 is a diagram showing a specific example of predictive candidates displayed on the display unit 21.

The memory 44 stores a first function in association with character strings related to the first function, and a second function in association with character strings related to the second function, the hierarchical level of the second function being under the first function. More specifically, for example, as shown in FIG. 20, the memory 44 stores a mail application D1 as the first function that controls all of the mail functions, in association with a character string "mail" related to the mail application D1. In addition, the memory 44 stores second functions such as a new mail creating function D11, a mail receiving function D12, and a mail transmitting function D13, which are various functions belonging to the mail application D1, and are displayed on the display unit 21 when the mail application D1 is activated (i.e. being at a lower hierarchical level) in association with character strings "new mail creation", "mail reception", and "mail transmission" that are related to the new mail creating function D11, the mail receiving function D12 and the mail transmitting function D13, respectively.

In addition, in a case in which the operation detecting unit 54 detects an operation, and the display unit 21 displays a predetermined character according to this operation, a character string related to the predetermined character among character strings related to the first function, and a character string related to the predetermined character among character strings related to the second function, the character string control unit 55 executes control such that a display mode of the character string "mail" related to the first function on the display unit 21 is different from a display mode of the character string related to the second function on the display unit 21. More specifically, in a case in which the operation detecting unit 54 detects an operation, and the display unit 21 displays a predetermined hiragana character "me" according to this operation, as well as a character string "mail" related to the mail application D1, and the character strings "mail creation", "mail reception" and "mail transmission" related to the new mail creating function D11, the mail receiving function D12 and the mail transmitting function D13, respectively, the character string control unit 55 executes control such that a display mode of the character string "mail" on the display unit 21 is different from a display mode of the character strings "mail creation", "mail reception" and "mail transmission" on the display unit 21.

More specifically, as shown in FIG. 21, the character string control unit 55 acquires a data structure in the mail application D1 from a file system (not shown) that manages various files in the control unit 45*d*. Furthermore, based on the data structure thus acquired, the character string control unit 55 executes control such that the character string "mail" related to the mail application D1 is displayed in a font that is different from the font of the other character strings, and the character strings "mail creation", "mail reception" and "mail transmission" are displayed with underlining.

Moreover, for example, the memory 44 stores a predetermined hiragana character "me" in association with the character string "mail" related to the predetermined hiragana character "me". In addition, as shown in FIG. 21, in a case in which the operation detecting unit 54 detects an operation, the character string control unit 55 displays a predetermined hiragana character "me" on the display unit 21 according to this operation, and the character string control unit 55 may also display, on the display unit 21, "mail", "mail creation", "mail reception" and "mail transmission" that are character strings related to the predetermined hiragana character "me" among character strings related to predetermined functions including the first and second functions, together with predictive candidates related to the predetermined hiragana character pronounced as "me" in the Hepburn system (for example, "me (eye)", "me a ta ra shi i (novel)", "me ka ji ki (swordfish)", etc.).

Moreover, as shown in FIG. 21, on the display unit 21, the character string control unit 55 may execute control such that a display mode of the character strings "mail", "mail creation", "mail reception" and "mail transmission" related to the predetermined function is different from a display mode of the predictive candidates "me", "me a ta ra shi i" and "me ka ji ki" related to the predetermined hiragana character "me" according to the operation in the operation unit 11.

Furthermore, the character string control unit 55 may display the character strings "mail", "mail creation", "mail reception" and "mail transmission" related to the predetermined function as ranked higher than the predictive candidates "me", "me a ta ra shi i" and "me ka ji ki" related to the predetermined hiragana character "me". Here, "ranked higher" refers to being closer to the top in the order of displaying the predictive candidates.

According to the cellular telephone device 1*d* of the present embodiment, in a case in which the operation detecting unit 54 detects an operation, according to this operation, the character string control unit 55 displays a predetermined character, character strings associated with the predetermined character among character strings related to a predetermined function stored in the memory 44, information related to the first operation for the character string related to the predetermined function, and information related to the second operation for the character string related to the predetermined function, on the display unit 21. In addition, in a case in which the first operation for the character string related to the predetermined function is executed, the character string control unit 55 displays a character string related to the predetermined function on the display unit 21, in place of a predetermined character according to an operation displayed on the display unit 21. Furthermore, in a case in which the second operation for the character string related to the predetermined function displayed on the display unit 21 is executed, the application execution unit 51 activates the function associated with the character string related to the predetermined function.

As a result, depending on the operation for a character string related to a predetermined function displayed on the display unit 21, the cellular telephone device 1d can select whether a function associated with a character string related to the predetermined function is activated, or a character string related to the predetermined function is displayed in place of the predetermined character. Therefore, a character string displayed on the display unit 21 can be effectively utilized.

Moreover, according to the cellular telephone device 1d of the present embodiment, in a case in which the operation detecting unit 54 detects an operation in a state of the standby screen, according to this operation, the character string control unit 55 displays a predetermined character, character strings associated with the predetermined character among character strings related to a predetermined function stored in the memory 44, information related to the first operation for the character string related to the predetermined function, and information related to the second operation for the character string related to the predetermined function, on the display unit 21. In addition, in a case in which the first operation for the character string related to the predetermined function is executed, the character string control unit 55 displays a character string related to the predetermined function on the display unit 21, in place of a predetermined character according to an operation displayed on the display unit 21. Furthermore, in a case in which the second operation for the character string related to the predetermined function displayed on the display unit 21 is executed, the application execution unit 51 activates the function associated with the character string related to the predetermined function.

As a result, by inputting a character string on the standby screen, the cellular telephone device 1d can select whether a function associated with a character string related to a predetermined function is activated, or a character string related to the predetermined function is displayed in place of a predetermined character. Therefore, a character string displayed on the display unit 21 can be effectively utilized from the standby screen, and the operability can be improved.

Moreover, according to the cellular telephone device 1d of the present embodiment, in a case in which the operation detecting unit 54 detects an operation, for example, in a state different from the standby screen such as a state where another application (such as a memo pad or mail) is activated, the character string control unit 55 displays a predetermined character on the display unit 21 depending on this operation, and does not display a character string associated with a predetermined character on the display unit 21, among character strings related to a predetermined function stored in the memory 44.

As a result, in the cellular telephone device 1d, in a case of displaying a character string related to a predetermined function stored in the function execution table of the memory 44 on another character input screen such as a memo pad or a mail input screen as well, the usability may be deteriorated; however, in such a case, the usability can be improved by not displaying the character string related to the predetermined function.

In addition, according to the cellular telephone device 1d of the present embodiment, in a case in which the operation detecting unit 54 detects an operation, and the display unit 21 displays a predetermined character according to this operation, a character string related to the predetermined character among character strings related to the first function, and a character string related to the predetermined character among character strings related to the second function, the character string control unit 55 executes control such that a display mode of the character string related to the first function on the display unit 21 is different from a display mode of the character string related to the second function on the display unit 21.

As a result, in the cellular telephone device 1d, in a case in which the display unit displays a character string related to the second function that is at a lower hierarchical level than the first function, by differentiating the display modes of the first and second functions, the functions can be more easily distinguished, and the convenience can be improved.

Furthermore, according to the cellular telephone device 1d of the present embodiment, in a case in which the operation detecting unit 54 detects an operation, the character string control unit 55 displays a predetermined character on the display unit 21 according to this operation, and displays predictive candidates related to the predetermined character, and character strings related to the predetermined character among character strings related to the predetermined function on the display unit 21.

As a result, the cellular telephone device 1d displays predictive candidates related to a predetermined character, and displays character strings related to a predetermined function as some of the predictive candidates, it is possible to utilize not only character strings related to a predetermined function but also predictive candidates related to a predetermined character; therefore, the convenience of the cellular telephone device 1d as an electronic device can be improved.

Moreover, according to the cellular telephone device 1d of the present embodiment, on the display unit 21, the character string control unit 55 executes control such that a display mode of character strings related to a predetermined function is different from a display mode of predictive candidates related to a predetermined character according to an operation in the operation unit 11.

As a result, in the cellular telephone device 1d, in a case in which character strings related to a predetermined function are displayed together with ordinary predictive candidates, by differentiating the respective display modes, the character strings and the ordinary predictive candidates can be easier to be distinguished, and the convenience can be improved.

In addition, according to the cellular telephone device 1d of the present embodiment, the character string control unit 55 displays character strings related to a predetermined function as ranked higher than predictive candidates related to a predetermined character.

As a result, a function can be activated by determining an input of character strings that are preferentially displayed as ranked high, the cellular telephone device 1d can enhance the operability.

Although the embodiments of the present invention have been described above, the present invention is not limited to the aforementioned embodiments, and can be modified as appropriate. For example, in the aforementioned embodiments, determination is made as to whether the application A is activated, and only in a case in which the application A is activated, the function execution table and the predictive candidate table are referred to, and character strings related to a predetermined function are displayed; however, the present invention is not limited thereto. For example, on other input screens such as a memo pad screen or a mail creation screen as well, character strings related to a predetermined function may be displayed by referring to the function execution table.

Furthermore, in the present embodiment, in a case in which it is determined that the application A is not activated, predictive candidates related to a predetermined character are displayed on the display unit by referring to the predictive candidate table alone; however, at this time, depending on the referred contents of the predictive candidate table, a case is conceivable in which, as a predictive candidate related to a predetermined character, a character string related to the predetermined character may be displayed among character strings related to a predetermined function. In such a case, depending on the operation for the predictive candidate, in place of the predetermined character, selection may be enabled as to whether the predictive candidate is displayed or the predetermined function is activated.

Moreover, in the present embodiment, in a case in which the cursor is located on a character string related to a predetermined character among character strings related to a predetermined function (in a case in which the character string related to the predetermined function is selected), information related to the first operation and information related to the second operation are displayed, respectively; however, the present invention is not limited thereto, and as long as a character string related to the predetermined function is displayed on the display unit, even if the cursor is not located thereon, control may be executed to display the information related to the first operation and the information related to the second operation.

In addition, in the present embodiment, in a case in which the operation detecting unit detects an operation, depending on the operation, a predetermined character, character strings related to the predetermined character among character strings related to a predetermined function, and information related to the first operation and information related to the second operation for the character string related to the predetermined function are displayed; however, control may be executed such that, even if the information related to the first operation and the information related to the second operation are not displayed, in a case in which the first operation is executed for the character string related to the predetermined function displayed on the display unit, a character string related to the predetermined function is displayed in place of the predetermined character, and in a case in which the second operation is executed, the predetermined function is activated.

Furthermore, in the present embodiment, character strings related to a predetermined character among character strings related to a predetermined function are displayed together with predictive candidates related to the predetermined character on an area for displaying predictive candidates on the display unit; however, the present invention is not limited thereto, and the area for displaying character strings related to a predetermined function may not be the area for displaying predictive candidates. Moreover, depending on the operation, among character strings related to a predetermined character and a predetermined function, character strings related to the predetermined character may be displayed on the display unit, and predictive candidates related to the predetermined character may not be displayed.

In addition, in the aforementioned embodiments, function names having a predetermined character as their initial character are stored in the function execution table shown in FIG. 15; however, the present invention is not limited thereto, and for example, the table may be configured such that a predetermined character is associated with character strings related to a function. Furthermore, such association may not be implemented by way of the table format.

Moreover, the method of key assignment shown in FIG. 3 is an example, and a method thereof is not limited to the present method.

It should be noted that, although the cellular telephone device 1 is described as an electronic device in the aforementioned embodiments, the present invention is not limited thereto, and the electronic device may be a PHS (Personal Handyphone System), a PDA (Personal Digital Assistant), a portable navigation device, a notebook PC, a mobile gaming device or the like.

Although the embodiments of the present invention have been described above, the present invention is not limited to the aforementioned embodiments. In addition, the effects described in the embodiments of the present invention are merely an enumeration of the most preferred effects arising from the present invention, and the effects according to the present invention are not limited to those described in the embodiments of the present invention.

EXPLANATION OF REFERENCE NUMERALS 1, 1a, 1b, 1c, 1d cellular telephone device (electronic device)
11 operation unit (input unit)
21 display unit
22 receiver
23 driver IC
40 main antenna
41 RF circuit unit
42 display control unit
43 sound processing unit
44 memory (storage unit)
45, 45a, 45b, 45c control unit
46 acceleration sensor (sensor)
50, 50a, 50b, 50c character input unit
51 application execution unit
52 setting control unit
53 sensor control unit

The invention claimed is:

1. An electronic device, comprising:
a display unit that displays a character input screen;
a sensor that detects motion;
an input unit that inputs a character to be displayed on the character input screen; and
a control unit that displays, on the display unit, conversion candidates or predictive candidates for the character that has been input from the input unit,
wherein the control unit displays names of applications or names of processing in the applications, and when any one of the names is selected, the control unit executes processing of an application corresponding to the selected name;
wherein, if there are names of functions for setting states of the electronic device, the control unit displays the names of functions along with the names or a name of processing, and when any one of the names of functions is selected, the control unit executes setting of a state of the electronic device corresponding to the selected name,
wherein the control unit accepts selection of any one of the names of the processing or the names of the functions according to type of the motion detected by the sensor,
wherein the control unit alternately displays the names of the processing or the names of the functions as ranked high in order in response to the sensor detecting predetermined motion in a state where the names of the processing or the names of the functions are displayed as mixed with the predictive candidates, and
displays the names of the processing or the names of the functions as mixed with the predictive candidates in response to the sensor detecting predetermined motion in a state where the names of the processing or the names of the functions are displayed as ranked high in order, the names of the processing and the names of the functions representing activity candidates, in response to selection of one of which the control unit executes processing corresponding to the selected activity candidate, the predictive candidates representing at least one character, in response to selection of which the control unit adds the at least one character to the character input screen.

2. The electronic device according to claim 1, wherein, when any one of the names is selected, the control unit executes processing of an application corresponding to the selected name, or executes processing of displaying the selected name as a character string on the display unit.

3. The electronic device according to claim 1, wherein, in response to the input unit accepting an input of a character in a state where an initial screen is displayed on the display unit, the control unit activates an application related to the character input screen that displays the input character.

4. An electronic device, comprising:
a display unit that displays a character input screen;
a sensor that detects motion;
an input unit that inputs a character to be displayed on the character input screen; and
a control unit that displays, on the display unit, conversion candidates or predictive candidates for the character that has been input from the input unit,
wherein, when a name of an application is displayed as an input character string on the display unit, the control unit displays names of processing in the application as predictive candidates regarding the name of the application, and when a name of processing is selected, the control unit executes the processing corresponding to the name,
wherein, if there are names of functions for setting states of the electronic device as the conversion candidates or the predictive candidates, the control unit displays the names of functions along with the names or a name of processing, and when any one of the names of functions is selected, the control unit executes setting of a state of the electronic device corresponding to the selected name,
wherein the control unit accepts selection of any one of the names of the processing or the names of the functions according to type of the motion detected by the sensor,
wherein the control unit alternately displays the names of the processing or the names of the functions in response to the sensor detecting predetermined motion in a state where the predictive candidates are displayed, and
displays the predictive candidates in response to the sensor detecting predetermined motion in a state where the names of the processing or the names of the functions are displayed, the names of the processing and the names of the functions representing activity candidates, in response to selection of one of which the control unit executes processing corresponding to the selected activity candidate, the predictive candidates representing at least one character, in response to selection of which the control unit adds the at least one character to the character input screen.

5. The electronic device according to claim 4, wherein, when the name of the processing is selected, the control unit executes processing corresponding to the name, or executes processing of displaying the name of the processing as a character string on the display unit.

6. An electronic device, comprising:
a display unit that displays a character input screen;
a sensor that detects motion;
an input unit that inputs a character to be displayed on the character input screen; and
a control unit that displays, on the display unit, conversion candidates or predictive candidates for the character that has been input from the input unit,
wherein the control unit displays names of applications in a plurality of different display modes as the conversion candidates or the predictive candidates, and
wherein, when selecting a name of an application displayed in one display mode from among the plurality of display modes, the control unit executes processing regarding an application corresponding to the selected name,
wherein, if there are names of functions for setting states of the electronic device as the conversion candidates or the predictive candidates, the control unit displays the names of functions along with the names or a name of processing, and when any one of the names of functions is selected, the control unit executes setting of a state of the electronic device corresponding to the selected name,
wherein the control unit accepts selection of any one of the names of the processing or the names of the functions according to type of the motion detected by the sensor,
wherein the control unit alternately displays the names of the processing or the names of the functions in response to the sensor detecting predetermined motion in a state where the predictive candidates are displayed, and
displays the predictive candidates in response to the sensor detecting predetermined motion in a state where the names of the processing or the names of the functions are displayed, the names of the processing and the names of the functions representing activity candidates, in response to selection of one of which the control unit executes processing corresponding to the selected activity candidate, the predictive candidates representing at least one character, in response to selection of which the control unit adds the at least one character to the character input screen.

7. The electronic device according to claim 6,
wherein, when a name of an application displayed in one display mode among the plurality of display modes is selected, the control unit executes processing regarding an application corresponding to the name thus selected, and
wherein, when a name of an application displayed in another display mode among the plurality of display modes is selected, the control unit displays the name of the application as a character string on the display unit.

* * * * *